(12) United States Patent
Norris et al.

(10) Patent No.: US 7,113,919 B1
(45) Date of Patent: Sep. 26, 2006

(54) SYSTEM AND METHOD FOR CONFIGURING PRODUCTS OVER A COMMUNICATIONS NETWORK

(75) Inventors: Eric W. Norris, Wynnewood, PA (US); Walter C. DeSouza, Bryn Mawr, PA (US)

(73) Assignee: Chemdomain, Inc., Plymouth Meeting, PA (US)

( * ) Notice: Subject to any disclaimer, the term of this patent is extended or adjusted under 35 U.S.C. 154(b) by 399 days.

(21) Appl. No.: 09/643,841

(22) Filed: Aug. 22, 2000

Related U.S. Application Data

(60) Provisional application No. 60/185,954, filed on Feb. 29, 2000.

(51) Int. Cl.
*G06F 17/60* (2006.01)

(52) U.S. Cl. .......................................... 705/26; 705/14
(58) Field of Classification Search ................ 705/26, 705/77, 14; 707/3, 104.1; 702/19; 345/84.1; 438/17
See application file for complete search history.

(56) References Cited

U.S. PATENT DOCUMENTS

| | | | | |
|---|---|---|---|---|
| 4,703,423 A | * | 10/1987 | Bado et al. ..................... | 705/1 |
| 5,293,479 A | * | 3/1994 | Quintero et al. ............ | 345/841 |
| 6,108,640 A | * | 8/2000 | Slotznick ..................... | 705/26 |
| 6,125,353 A | * | 9/2000 | Yagasaki ..................... | 705/27 |
| 6,304,855 B1 | * | 10/2001 | Burke .......................... | 705/27 |
| 6,319,737 B1 | * | 11/2001 | Putnam et al. ................ | 438/17 |
| 6,360,216 B1 | * | 3/2002 | Hennessey et al. ............ | 707/3 |
| 6,421,612 B1 | * | 7/2002 | Agrafiotis et al. ............ | 702/19 |
| 6,654,736 B1 | * | 11/2003 | Ellis et al. ..................... | 707/3 |

OTHER PUBLICATIONS

Maxim Home Page; C:\WINNT\Profiles\mwest\Local Settings\Temporary Internet Files\OLK80C\Maxim Home Page.htm, 1 page.
Maxim Products; C:\WINNT\Profiles\mwest\Local Settings\Temporary Internet Files\OLK80C\Maxim Products.htm, 1 page.
Maxim's Parametric Search; C:\WINNT\Profiles\mwest\Local Settings\Temporary Internet Files\OLK80C\Maxim's Parametric Search.htm, 3 pages.
Maxim Video Buffers; C:\WINNT\Profiles\mwest\Local Settings\Temporary Internet Files\OLK80C\Maxim Video Buffers.htm, 2 pages.
Maxim Search Data Sheets; C:\WINNT\Profiles\mwest\Local Settings\Temporary Internet Files\OLK80C\Maxim Search Data Sheets.htm, 1 page.
Maxim Data Sheets; C:\WINNT\Profiles\mwest\Local Settings\Temporary Internet Files\OLK80C\Maxim Data Sheets.htm, 1 page.
Maxim Max2680, Max2681, Max2682; C:\WINNT\Profiles\mwest\Local Settings\Temporary Internet Files\OLK80C\Maxim MAX2680 MAX2681 MAX2682 400MHz to 2_5GHz Low-Noise SiGe Downconverter Mixers.htm, 2 pages.

(Continued)

*Primary Examiner*—Jeffrey D. Carlson
(74) *Attorney, Agent, or Firm*—Woodcock Washburn LLP

(57) ABSTRACT

The invention relates to a system and method for the automated selection of formulations and/or formulation components by specifying product characteristics. In particular, the system and method serve customers within market segments that use selected components as raw materials for manufacture of specialty products and that require an understanding of how the selected components effect performance. For example, such products as electronic circuits, coatings, adhesives, sealants, inks, polishes, cleaners, and detergents fall within the profile of such products.

100 Claims, 17 Drawing Sheets

OTHER PUBLICATIONS

Maxim Search Data Sheets; C:\WINNT\Profiles\mwest\Local Settings\Temporary Internet Files\OLK80C\Maxim Search Data Sheets1.htm, 1 page.

ADI-Major Products Markets & Applications; C:\WINNT\Profiles\mwest\Local Settings\Temporary Internet Files\OLK80C\ADI—Major Product Markets Applications.htm, 1 page.

ADI-Technical Support; C:\WINNT\Profiles\mwest\Local Settings\Temporary Internet Files\OLK80C\ADI—Technical Support.htm, 1 page.

ADI-Products and Datasheets; C:\WINNT\Profiles\mwest\Local Settings\Temporary Internet Files\OLK80C\ADI—Products and Datasheets Selection Guides.htm, 1 page.

ADI-Products and Datasheets: Selection Guides; C:\WINNT\Profiles\mwest\Local Settings\Temporary Internet Files\OLK80C\ADI—Products and Datasheets.htm, 1 page.

ADI-Instrumentation Amplifier Selection Guide; C:\WINNT\Profiles\mwest\Local Settings\Temporary Internet Files\OLK80C\ADI—Instrumentation Amplifier Selection Guide.htm, 4 pages.

ADI-Interface Products Selection Guide; C:\WINNT\Profiles\mwest\Local Settings\Temporary Internet Files\OLK80C\ADI—Interface Products Selection Guide.htm, 4 pages.

ADI-Low-Power Digital-to-Analog Converters; C:\WINNT\Profiles\mwest\Local Settings\Temporary Internet Files\OLK80C\ADI—Low-Power Digital-to-Analog Converters.htm, 4 pages.

ADI-Motor Control, C:\WINNT\Profiles\mwest\Local Settings\Temporary Internet Files\OLK80C\ADI—Motor Control.htm, 1 page.

ADI-Audio Solutions; C:\WINNT\Profiles\mwest\Local Settings\Temporary Internet Files\OLK80C\ADI—Audio Solutions.htm, page 1.

ADI- Car Alarms and other Security Systems; C:\WINNT\Profiles\mwest\Local Settings\Temporary Internet Files\OLK80C\ADI—Car Alarms and Other Security Systems.htm, 1 page.

ADI-Communications and Telephony Solutions; C:\WINNT\Profiles\mwest\Local Settings\Temporary Internet Files\OLK80C\ADI—Communications and Telephony Solutions.htm, 2 pages.

ADI-Development Tools and Evaluation Kits; C:\WINNT\Profiles\mwest\Local Settings\Temporary Internet Files\OLK80C\ADI—Development Tools Evaluation Kits.htm, 6 pages.

ADI-Digital Potentiometers; C:\WINNT\Profiles\mwest\Local Settings\Temporary Internet Files\OLK80C\ADI—Digital Potentiometers.htm, 3 pages.

ADI-iMEMS: Integrated Micro Electro Mechanical Acceleration Sensors; C:\WINNT\Profiles\mwest\Local Settings\Temporary Internet Files\OLK80C\ADI—iMEMS Integrated ADI Micro Electro Mechanical Acceleration Sensors.htm, 1 page.

ADI-Signal Chains; C:\WINNT\Profiles\mwest\Local Settings\Temporary Internet Files\OLK80C\ADI Signal Chains.htm, 2 pages.

ADI Weigh Scale; C:\WINNT\Profiles\mwest\Local Settings\Temporary Internet Files\OLK80C\ADI Weigh Scale.htm, 1 page.

ADI- Three Phase Trivector Energy Meter; C:\WINNT\Profiles\mwest\Local Settings\Temporary Internet Files\OLK80C\ADI Energy Meter.htm, 1 page.

National Electronic Products; C:\WINNT\Profiles\mwest\Local Settings\Temporary Internet Files\OLK80C\National Electronic Products.htm, 30 pages.

National Webench Press Release; C:\WINNT\Profiles\mwest\Local Settings\Temporary Internet Files\OLK80C\National Webench Press Release.htm, 5 pages.

"GetPlastic.com Opens First E-Market to Help Plastics Processors Procure High-Performance Resins, Create Custom Compounds," *PR Newswire*, Jun. 13, 2000, No. 11483828, 3 pages.

"LNP Introduces Web-Based Data," *Flame Retardancy News*, Oct. 1999, 9(10), No. 06783318, 2 pages.

"Need2Buy Releases 'Next Generation' E-Procurement Solution for Electronic Components Industry," *Business Wire*, Mar. 20, 2001, 3 pages.

BatchMaster eWorkplace Solutions, http://www.batchmaster.com, printed Feb. 27, 2001, 12 pages.

Hillier T. et al., "Laboratory Module," eWorkplace Solutions, Feb. 2000, 2 pages.

\* cited by examiner

AC Coupling an External CMOS Clock Powered from a Single Positive Supply, V+

Filtering AC Signals from High DC Voltages

SYSTEM AND METHOD FOR CONFIGURING PRODUCTS OVER A COMMUNICATIONS NETWORK

This Application claims benefit of U.S. Provisional Application Ser. No. 60/185,954 filed Feb. 29, 2000.

TECHNICAL FIELD

The invention relates generally to systems and methods for identifying products for purchase over a computer network. More particularly, the invention relates to the selection and purchase of specialty products over a computer network.

BACKGROUND OF THE INVENTION

Many industries require sophisticated buyer knowledge or extensive seller hand holding in order to properly match a product with a buyer's needs, which is typically a time-consuming, human-resource-intensive task. For example, in the specialty chemical or electronics industry, when a component producer, distributor, manufacturer, industry consultant or consortia, virtual distributors or other value-added party (hereinafter all referred to as "supplier" for convenience) introduces a new component(s) (e.g., a new integrated circuit or new specialty chemical), the supplier must not only inform customers of the availability of the new component but also must inform customers how to integrate the component into an assembled product or formulation (both referred to herein by the term "formulation"). Indeed, some of the suppliers in the chain may provide a new product based on the newly developed component and hence will have to educate customers about the characteristics of the product. Otherwise, potential customers may not fully comprehend the utility of the new component or product and the advance offered by it, resulting in lack of acceptance and/or lost sales.

Consider, for example, the many uses to which TEFLON has been applied since its first introduction (e.g., coating of pots and pans, as an oil additive, etc.). After its introduction, the maker of component products such as TEFLON may continue to introduce new product categories to which its advantages may be brought to bear. If TEFLON, for example, was discovered to bring useful properties to a paint product, then the supplier of TEFLON may want to inform paint formulators about the new paint properties offered by the TEFLON additive. In order to provide the information, particularly to smaller specialty paint manufacturers, the supplier may need to provide a specification sheet outlining the basic ingredient list for formulating a paint product using TEFLON along with performance characteristics of the sample paint formulation to provide a basis for comparison to similarly positioned product.

After paint developers understand the basic technique for integrating TEFLON with paint products, they could further develop and enhance their own—perhaps secret—formulations by incorporating the new additive as suggested by the specification. A similar example in a different context applies to the electronics industry. An integrated circuit supplier may have developed a reduced power clock integrated circuit; however, before integrating the product into higher level circuits, electronics manufactures need to understand both the performance characteristics (so as to entice them to incorporate the new component) and a basic operational circuit (to begin to understand how to incorporate the component into their existing products).

Conventionally, such industries are typified as relying on component specifications that not only describe the performance characteristics of the component but also provide a starter product or formulation that describes one or more basic uses of the component. Customers can then purchase the component or components necessary to build the example product and use the example as a starting point for integration into their own products.

Typically, such markets are serviced by a myriad of suppliers each offering a similar but somewhat different component, making the task of matching a buyer with an appropriate component even more complex. Other than the electronic and chemical industries, other industry examples include industrial gases, pharmaceuticals and food products.

The problem of matching customers with proper components may be further magnified by a fragmented distribution system. For example, the value chain for all industrial chemicals typically contains three steps. First, chemical suppliers (hundreds within the U.S.) manufacture technologies using minerals or petrochemicals as raw materials. Second, manufacturers or 'formulators' in various industries buy directly or via distributor from specialty and commodity suppliers to formulate these chemicals directly into finished goods. Third, the finished goods are distributed for use or sale in their final markets.

Given the broad range of market segments and chemicals, the customer base for industrial chemicals has historically been quite fragmented. Even with a wave of consolidation over the past 20 years, there remains a considerable degree of fragmentation in many industrial customer bases. For example, the coatings market, one of the larger markets for industrial chemicals with global revenues of $60–70 billion (in 1999 dollars), has experienced a tremendous level of consolidation in the 1990's. Yet, according to 1997 research from Kusumgar, Nerlfi & Growney (Chemical Research Group), in the U.S., the top 10 coatings producers account for about 50% of sales, the top 50 producers account for about 75% of sales and the remaining 25% is fragmented among 700 different firms. Hence, using the TEFLON example above, in order to capture as many sales as possible for a new use for TEFLON in the coatings market, the manufacture would have to reach and educate 700 different firms to capture the remaining 25% of the coatings market.

The specialty component of industrial chemicals encompasses chemicals that are the primary building blocks for delivering value-added products in a wide range of industries. Specialties are typically blended or 'formulated' with industrial commodities to provide the unique performance features that an industrial manufacturer would require. Historically, many specialties have been proprietary in nature and therefore had a limited number of competitive alternatives. Key trends of the past few years have been the maturation of technology, the globalization of specialty chemical suppliers and the resultant advent of price competition. In specialties, a growing number of suppliers can offer very similar technology. In cases where there is little other know-how, service or value that accompanies the sale of such a specialty, price has become the lowest common denominator, and the product has become more of a commodity.

However, for a great many specialty chemicals, there is a need for substantial know-how and service (commonly referred to as "tech service") in order to keep up with market, technology and customer trends. In segments where this is the case, the manner of formulation of the various specialty chemicals with commodity components will determine eventual system performance and cost for the customer, which typically cannot be compromised for a lower price specialty alternative. In fact, in some cases, a higher priced specialty component may produce the lower cost system performance due to its efficacy in use. In such segments, specialty suppliers spend a large percentage of sales to handhold their customers and support the adoption of their products. Unlike commodity chemicals that are fungible and price driven, tech service for specialties can make all the difference in the selling process to maintain premium pricing. Furthermore, use of tech service has the added benefit of uncovering new customer needs which existing technology cannot meet and, in turn, provides a pipeline for new product development for specialty suppliers. In essence, tech service from specialty suppliers is really a form of outsourced R&D to their customers.

Typical specialty chemical purchasers desire to purchase their chemicals based on performance criteria rather than on specific ingredients. For example, a small manufacturer of paint desiring to produce a new product line may know the performance criteria required of the new product before actually designating the ingredients that deliver the required performance. Hence, such a manufacturer may desire an architectural paint that will be sprayed on a metal substrate and have low odor properties without knowing what particular chemical combination would meet those functional needs. On the other hand, specialty chemical manufacturers may have a chemical component or components that, when mixed into paint formulations, work particularly on a metal substrate while having low odor properties. To date, matching a customer's functional requirements with the proper component or formulation has required human tech service support.

Various Internet sales sites have focused on commodities (e.g., CheMatch, Chemconnect) or laboratory supplies (Chemdex, Sciquest) or supply chain management (Envera, Elemica). Such sites generally provide customer choice, supplier neutrality and lowest cost for fungible products that are sold on (in these examples, on a chemical composition basis). Since a customer for specialty components typically needs to make a decision on a formulated performance basis using a detailed technical data analysis, current internet models prove inadequate.

Hence, there is a need to provide a method for matching customers with products that are based on a combination of multiple components whose interaction is hard to predict.

SUMMARY OF THE INVENTION

The invention relates to a method for the automated selection of formulations and/or formulation components by specifying product characteristics. In particular, the system and method serve customers within market segments that use selected components as raw materials for manufacture of specialty products and that require an understanding of how the selected components effect performance. For example, such products as electronic circuits, food, pharmacueticals, industrial gases, coatings, adhesives, sealants, inks, polishes, cleaners, and detergents fall within the profile of such products. According to another aspect of the invention, a method is provided for enabling suppliers in the distribution channel of formulations to obtain, classify, and manage formulation information as end user solutions for internal use or in cooperation with Web sites or other network sites of respective business partners. The method is implemented in part by software that runs on a Web site, using an ASP model. Any entity engaged in formulation development or support, referred to herein as "customers" or "users", can enroll at the Web site to use the method to find, research, store, compare and manage formulations. Users access the method directly from a page on their own Web site or on their intranet.

In accordance with another aspect of the invention, business partners, referred to herein as "affiliates", can act as content providers, as they provide selected starting point formulations to a controlled portion of their customers who are also registered users, thus creating a new vehicle for dissemination of formulations and enriching their customers' library of searchable formulations. Users request authorization from each affiliate they wish to connect to, and are then granted access to formulations the affiliates decide to make available to them.

In accordance with another aspect of the invention, formulation data sheets, use guides and test results are collected from users and affiliates, classified, interpreted and stored in the system database. This process enables the formulation to be used as a tool to ascertain direct fit with end user needs, rather than merely providing a list of ingredients.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings exemplary constructions of the invention; however, the invention should not be limited to the specific methods and instrumentalities disclosed. In the drawings:

FIG. 12 is an illustration of a user interface whereby a customer defines characteristics of the formulation sought;

FIG. 14 is an illustration of a user interface output of formulation according to rank;

FIG. 15 is an illustration of a user interface output of particular components of a selected formulation;

DETAILED DESCRIPTION OF THE INVENTION

Overview

Figure 1:
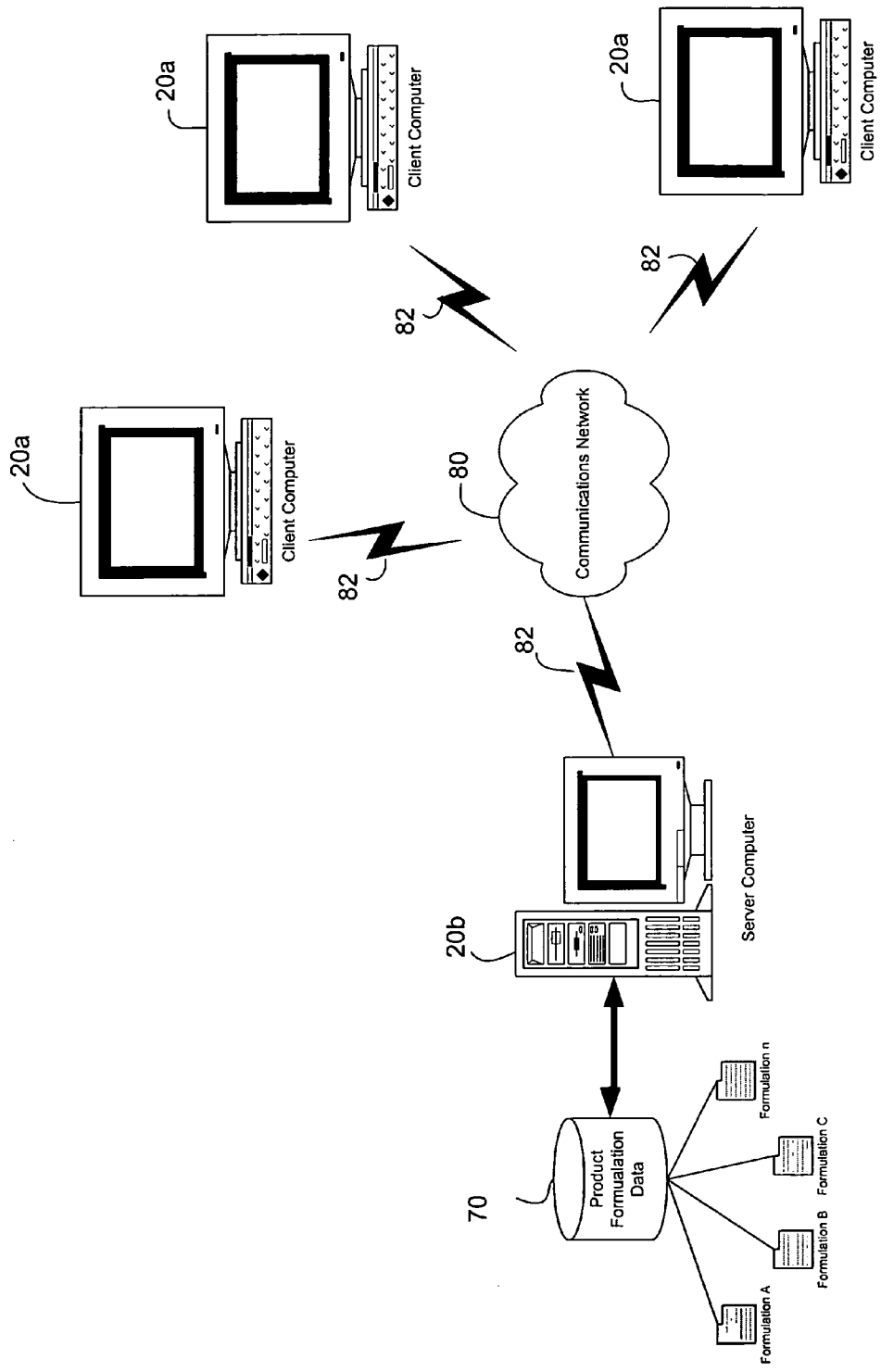
FIG. 1 is schematic diagram representing a network computer model in which aspects of the present invention may be incorporated.

The present invention is directed to an Internet-based platform that aggregates formulations (i.e., product specifications wherein the product is assembled from one or components and wherein the specification impart the understanding to build at least a prototype product) from one or more suppliers so that manufacturers/suppliers/distributors (herein all referred to as suppliers for clarity) may use the platform as a standard repository of formulations so that they can provide customers with access to the formulations. The platform further has the capability to retrieve the formulations on the basis of specified performance criteria.

Although the system is useful for individual suppliers to maintain their own sets of formulations, the system may also be employed across suppliers within an entire vertical market thereby providing a standard repository of formulations within a vertical market. As a consequence, customers may provide performance criteria to locate formulations that most appropriately meet their needs from a variety of suppliers.

The invention also presents a system for driving the purchase of the components that comprise the various formulations by purchasing the component or components in the context of the utility derived from its interaction with the other components of a given formulation.

In the following discussion, the phrase "target segments" refers to those industry segments wherein know-how is essential to supporting and making the sale. In the specialty chemical industry, for example, target segments include coatings, adhesives, sealants, inks, polishes, cleaners, detergents, pharmaceuticals, agrochemical, plastics, textile, and so on and total in the billions of dollars globally. Characteristics of the customer base in the target segments are that raw materials (both the specialty components and commodities) frequently are a high percentage of sales, specialty chemical dollar value is about 25% of total raw material cost, barriers to entry related to manufacturing infrastructure are quite low and, consequently, fragmentation of the customer base (particularly at the tail end of the market) is quite significant.

1. Formulation Know-How

Formulations are developed by combining multiple specialty and commodity chemicals ("ingredients") supplied by specialty and industrial chemical suppliers. As part of their tech service initiatives, chemical suppliers develop recommended starting point formulations which typically contain ingredients from multiple producers. The interaction of ingredients (in specific quantities and order of addition) is what creates performance characteristics that address the needs of formulators. Unfortunately, starting point formulations are typically classified by main ingredients rather than by performance criteria, which more directly corresponds to a formulator's needs. This issue is confounded by the fact that formulators do not have an effective way of finding and utilizing such starting point formulations due to their many sources, formats, media, versions and credibility. The net result is that formulators must follow a lengthy trial and error experiment process before arriving at a solution that meets the formulator's requirements.

Small customers often source their formulation components from distributors and, consequently, rely on them for tech service. It can be a cost prohibitive/low return effort for specialty component suppliers to focus their own tech service capabilities on smaller buying accounts versus their larger direct buying accounts. Instead, when possible, suppliers resort to training distributor reps on component formulation expertise. Such reps are typically regionally focused, asked to sell a broad range of components and lack a technical background. As a result, these reps are ineffective at offering value-added tech service, and many smaller customers are forced to make uninformed or expensive decisions in choosing the right formulation or component for their need. Some customers may have some in-house formulation or design competency, but it is typically narrow, embodied in one individual and may not be sufficiently exposed to new developments of components and formulations in the market.

To address the needs outlined, according to an aspect of the invention, the system employs a formulation configuration process. This process begins with a series of inquiries to determine such criteria as the vertical market or target segment in which the customer operates and what the customer's needs are within that market. The system then uses a formulation database to generate formulation and supply options that contain components that match the customer's specified needs. With each option there may be a corresponding performance and cost profile, an order entry form to request sample materials, and testing procedures for verifying test results within the customer's own laboratory.

2. Lowest Cost Formulations

Large customers have direct access to the technical personnel of specialty and commodity suppliers who can help them optimize formulations to achieve the lowest cost for a given performance goal. Even still, suppliers often will not, for competitive reasons, make their large customers aware of all possible solutions. Smaller customers, on the other hand, must rely on their local distributor, who not only lacks technical sophistication (as mentioned above), but also typically only support a narrow range of competing commodities. In cases, where commodities can be substituted to achieve an improved cost profile, a single distributor can offer very little. This is a source of significant savings since commodities typically represent between 50–75% of the formulated cost. Consequently, the ability of the small customer to optimize cost is quite limited given the limited choice available.

During the formulation configuration process, the customer can specify both the performance and the cost profile it is seeking. The invention will provide matching solutions and may include a list of possible substitutes for component commodities in the formulation. The customer may then be asked to forecast its annual formulation requirements so that the system can send out electronic requests for quotations. The customer may review all quotation on a 'line by line' basis by individual components or on a formulated basis to ascertain which components and which solution they would like to pursue.

3. A Network Environment

FIG. 1 illustrates an exemplary network environment in which the invention may be employed. Of course, actual network and server environments can be arranged in a variety of configurations; however, the exemplary environment shown here provides a framework for understanding the type of environment in which the present invention operates.

The network may include client computers 20a, a server computer 20b, and data 70 accessible via server computer 20b. The client computers 20a are in electronic communication with the server computer 20b via communications network 80, e.g., an intranet. Client computers 20a are connected to the communications network by way of communications interfaces 82. Communications interfaces 82 can be any one of the well-known communications interfaces such as Ethernet connections, modem connections, and so on.

Server computer 20b provides management of data 70 by way of server software such as database server system software, described more fully below. As such, server 20b acts as a gatekeeper of data from a variety of data sources and provides that data to a variety of data consumers. Server computer 20b may maintain data in a relational database such as SQL Server available from Microsoft Corporation. Client computers 20a that desire to use access data stored by server computer 20b can access the data 70 via communications network 80. In the example wherein server 20b comprises a database server, such as a SQL server, client computers 20a request the data by way of SQL queries (e.g., update, insert, and delete) on the data stored in database 70.

Database 70 comprises a set of formulations along with other relevant data. For example, the database may comprise a set of specialty chemical formulations for paint, adhesives, ink, and so on. Additionally, the database may comprise a product formulated according to a number of subsystems or components, e.g., computer systems.

Where server computer 20b and client computers 20a are connected by way of an intranet or the Internet, communications may be facilitated by HTML, XML, and so on. Client computers 20a may employ a browser such as Internet Explorer or Netscape Navigator. Client computers 20a may represent suppliers, distributors, and/or buyers of formulations and/or components of the stored in database 70.

4. Formulation Web Server and ASP Model

Figure 2:
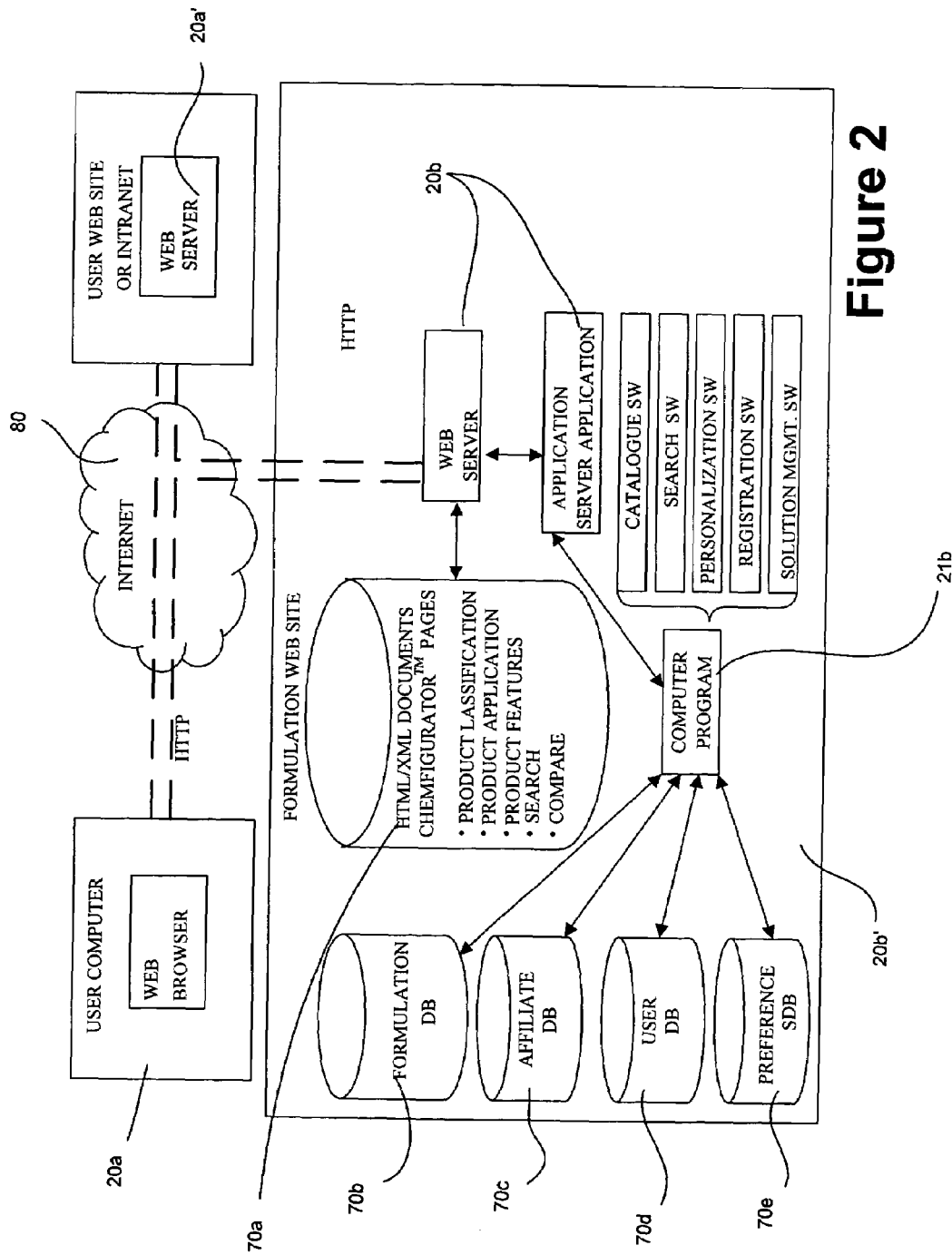
FIG. 2 is a schematic diagram of an example of aspects of the architecture of the present invention.

FIG. 2 illustrates an exemplary architecture for the system in accordance with an aspect of the invention. Here, the formulations web site comprises a web server 20b that receives and delivers content to clients 20a by way of the Internet 80. The content is preferably exchanged in the form of HTML, XML, or some like form of data exchange format created and/or maintained in data store 70a. Information in the form of formulation data received, preferably electronically by way of the Internet, from suppliers (e.g., web server 20a') is classified and stored in a database 70b. Formulation web site 20b' also maintains a database of affiliates 70c so that various affiliate information can be maintained and formulation database 70b can be maintained on a affiliate basis. Additionally users can set up accounts and maintain information in database 70d, and set preferences that are stored in preferences database 70e. Hence, the affiliates can use the system in an ASP model wherein all of their data would be conceptually maintained separate from other affiliates. All requests to the affiliate can be redirected to the Formulation web site 20b'to service the request. To a customer, the system would appear as though the affiliate were providing the formulations.

According to an aspect of the invention, users 20a can access formulation data stored in formulation database 70b by directly accessing formulation web server 20b. Therein, user 20a may have access to formulation data in its entirety or to selected formulation data based on a specific supplier. Additionally, user 20a may access formulation data by way of web server 20a', wherein web server 20a' redirects requests over to web server 20b in accordance with know redirection techniques. Once connected to web server 20b, redirected user 20a may have access to formulation data 70b in accordance with a previously arranged subset of formulation data that was negotiated between web server 20b and web server 20a'. This may include for example, all public formulation information maintained in formulation database 70b or a set of privately maintained formulation data maintained by the formulation web site on behalf of web server 20a'.

By allowing suppliers to store their formulations on the formulation web site, a common formulation format can be achieved across an industry and a common methodology of extracting formulations based on characteristics can be achieved. As a result, suppliers can combine/group or otherwise share formulation data that is uniformly accessible. Additionally, suppliers can provide the formulation data to distributors or other entities that way desire to have a structured formulation database that can be accessed by way of performance characteristics.

5. Formulation Database Structure

Figure 3:
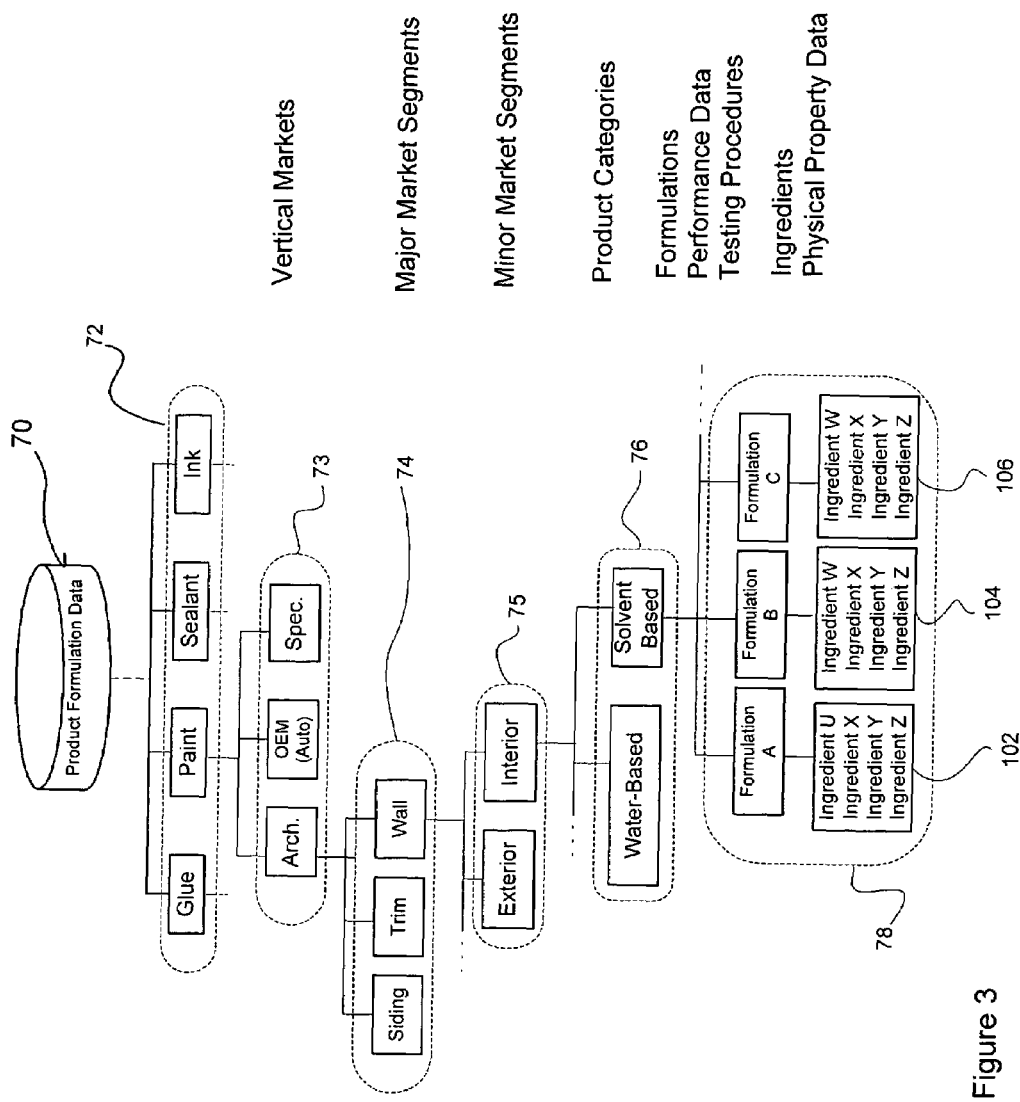
FIG. 3 is a schematic diagram of an example hierarchical layout of a database in accordance with the present invention.

FIG. 3 illustrates a hierarchical view of one embodiment of the organization of the formulations stored in database 70. The structure of FIG. 3 may be conceptually similar to the organization of data in other web site search engines wherein the same formulation may appear at different nodes in the tree and may be categorized under more than one search path. Conceptually, the database is organized by vertical market 72. Here, example vertical markets 72 include Adhesives, Paint, Sealant, and Ink; however, the invention contemplates the application of the present model to other products comprised wherein those products are configured from a selection of multiple components. Each of the vertical markets is further defined by market segments 73 that help a customer further identify a particular application (e.g., Architectural, OEM, Special Purpose). Within each of those segments, the formulations are further categorized by application 74 (e.g., siding, trim, wall, etc.). Further categories apply to further classify and categorize the formulations. Here, for example, each of the applications is categorized as interior or exterior 75 and water-based or solvent based 76 and so on until the lowest nodes in the categorization tree provides the categorized formulation. Note, however, that a given formulation may appear as a leaf node under multiple paths through the tree. That is a particular formulation may be suitable in multiple categories (e.g., Architectural and OEM).

Although the example hierarchy of FIG. 3 shows all of the formulations A, B, and C fitting nicely into the leaf nodes (e.g., Solvent Based), the formulations will also be categorized within each node along the path (as indicated in the Figure with an "x" in the appropriate node). Hence, for example, Formulation A may be searched for and located under any one of or combination of the nodes "Paint", "Architecture", "Wall", "Interior", and "Solvent Based".

Figure 4:
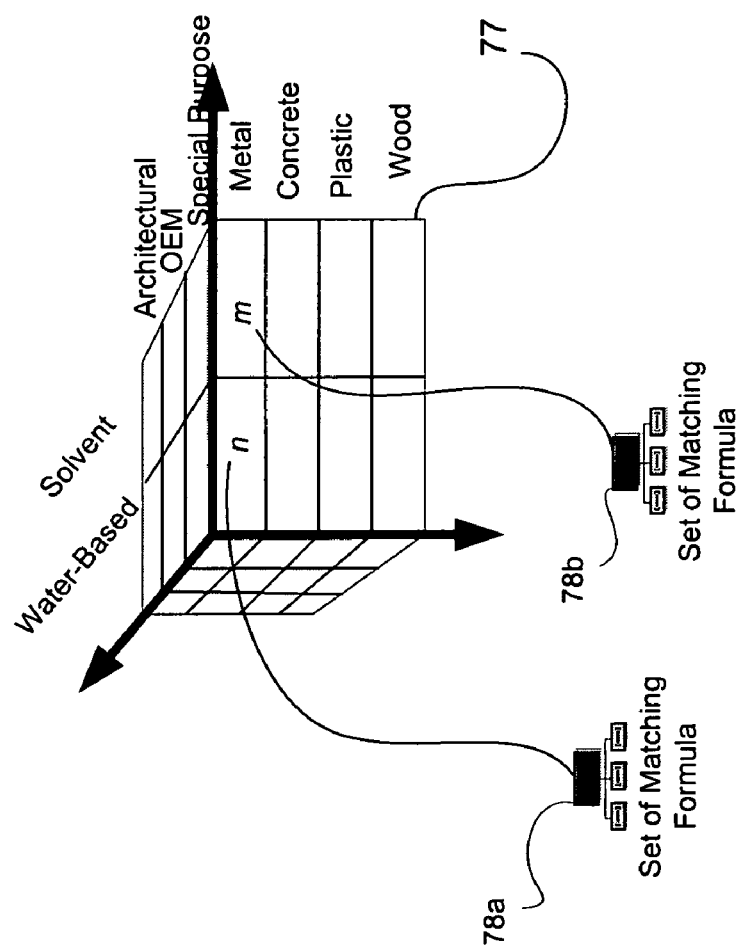
FIG. 4 is an illustration of an alternative data structure of the present invention using a data cube.

FIG. 4 provides another example of how the formulations may be organized and located. Here, an n dimensional cube 77 provides a pointer to a list of formulations that meet the criteria of the intersection of all of the attributes. For example, pointer n points to a set 78a of formulations that are useful as Special Purpose, Water-Based, Metal applications; whereas, pointer m points to a set 78*b* of formulations that are useful in producing Special Purpose, Solvent-Based, Metal applications.

6. Formulation System

Figure 5:
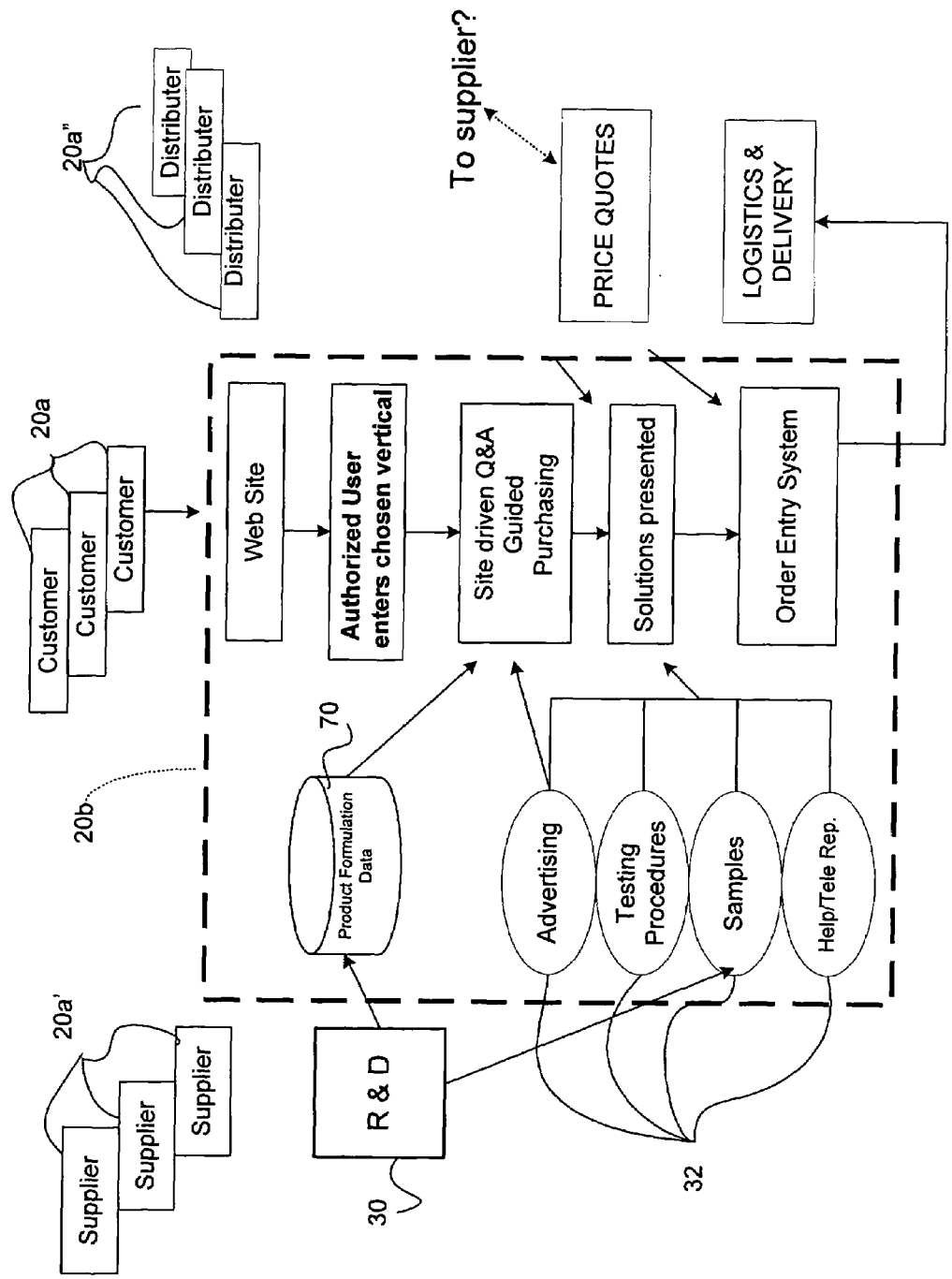
FIG. 5 is a block diagram representation of aspect of the flow of information through the system of the present invention.

FIG. 5 presents a schematic of a system for carrying out the process of the present invention. Essentially, customers 20*a* enter the system by way of an Internet connection into a web site. There, customers 20*a* find a formulation based on particular application requirements. Suppliers 20*a*' and/or distributors 20*a*" provide formulations for categorization and storage in database 70. Typically, the formulation information is provided by supplier driven research and development. New products and formulations are introduced by way of advertising, samples and etc. provided to customers 20*a*. Suppliers 20*a*' and/or distributors 20*a*" provide pricing information and accept delivery. The formulations provided by suppliers 20*a*' and distributors 20*a*" are entered into database 70 for selection by customers 20*a*.

When new products are introduced, suppliers 20*a*' and distributors 20*a*" can provide product advertising, literature, instructional information and so on, in order to educate potential customers about the virtue of a new formulation. Moreover, the instructional information may be precisely targeted based on selections made by customers 20*a* in arriving at formulation selections.

As alluded to above, customers 20*a* are generally buying products that require some assembly on the part of customers 20*a*. Hence, for example, a customer 20*a* seeking to buy paint is likely to supply end products incorporating the paint to others. For example, they may be a small paint supplier that does not have a sophisticated internal research and development team to discover or invent a new paint additive that produces a desirable property. On the other hand, customers 20*a* may have the sophistication to assemble the components supplied by suppliers 20*a*' and/or distributor 20*a*". So after the customer has selected a formulation, the components will be delivered to the customer for assembly.

For example, a paint formulation may comprise a formulation such as the paint formulation illustrated in Table 1, below.

|  | Supplier | Wt. | Vol % |
|---|---|---|---|
| Disperse |  |  |  |
| Alkyd Resin | McWhorter 5811 | 206.8 | 23.91 |
| Titanium Dioxide | Kronos 2090 | 310.2 | 9.10 |
| n-Butyl Acetate | Union Carbide | 52.7 | 7.16 |
| Then Add |  |  |  |
| Alkyd Resin | McWhorter 5811 | 206.7 | 23.90 |
| n-Butyl Acetate | Union Carbide | 164.4 | 22.33 |
| Acrylated Melamine Resin | Solutia Santolink AM 547 | 100.7 | 11.32 |
| Flow Modifier | Byk 300 | 2.1 | 0.27 |
| Drier Blend |  |  |  |
| 18% Cobalt | Manosec 18% | 1.3 | 0.14 |
| 18% Ziconium | Manosec 18% | 4.1 | 0.45 |
| 10% Calcium | Manosec 10% | 7.7 | 0.96 |
| Drier Accelerator | Activ-8 (R.T. Vanderbilt) | 2.1 | 0.26 |
| Anti-Skinning Agent | Exkin #2 (Huls AG) | 1.5 | 0.20 |

The supplier may designate the properties for this formulation as Application: Exterior, Metal; No Odor; Set-to-Touch; 20 min; Tack Free 90 min; etc. So that the formulation can be classified accordingly, for example, in the tree of FIG. 3.

Such a formulation may be delivered to the Formulation Web Server by way of an uploaded XML file. For example, the formulation may follow a format as follows:

```
<FormulationRecord>
<Category>Paint</Category>
<Market>Architectural</Market>
.
.
.
<FormulationName>Interior Latex - Gold line</FormulationName>
<FormulationAuthor>Golden Coatings S.A./FormulationAuthor>
<FormulationValidationStatus>Y<FormulationValidationStatus>
<Performance Criterion>No Odor<Performance Criterion>
.
.
.
</FormulationRecord>
```

Upon receiving an XML file bearing a formulation, the system of the present invention will attempt to properly categorize the information. Here, for example, the formulation will be categorized under Paint, Architectural, etc. Its performance characteristics will be set to No Odor, etc. In this way, supplier can continually add new formulations to the system by upload an XML file.

Figure 6A:
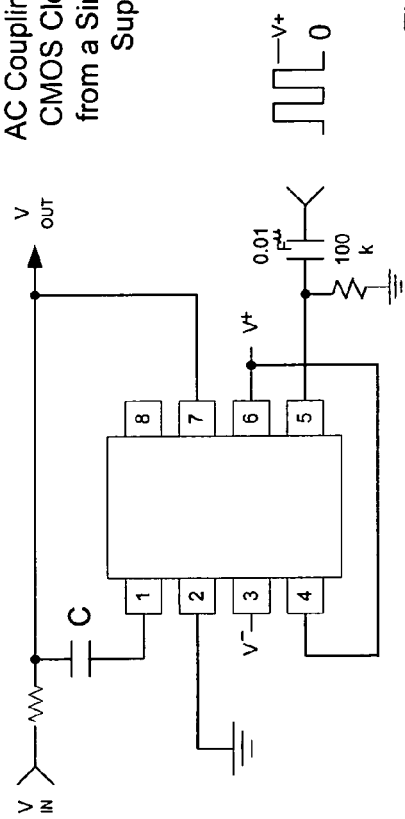
FIGS. 6A and 6B illustrate block diagrams of a electronic component formulation.
Figure 6B:
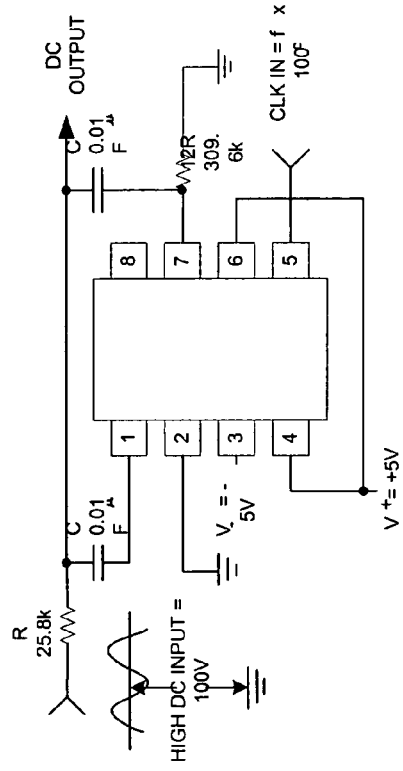

An example of electronic integrated circuit (IC) formulations are illustrated in FIGS. 6A and 6B. Here, an integrated circuit manufacturer has developed an IC that has a number of useful applications. For example, as shown in FIG. 6A, the circuit can be used to AC couple an external CMOS clock powered from a single positive supply voltage. Whereas, in FIG. 6B, the same IC is configured to filter AC signals from high DC voltages. Characteristics for the IC might be 5 volt power, input frequency range 0–20K, clock to cut-off frequency ratio of 100, filter gain at input frequency of 16 kHz of −52, etc. Using such characteristics the integrated circuit can be characterized accordingly in a tree structure similar in concept to the tree structure for the specialty chemicals illustrated in FIG. 3.

Figure 7:
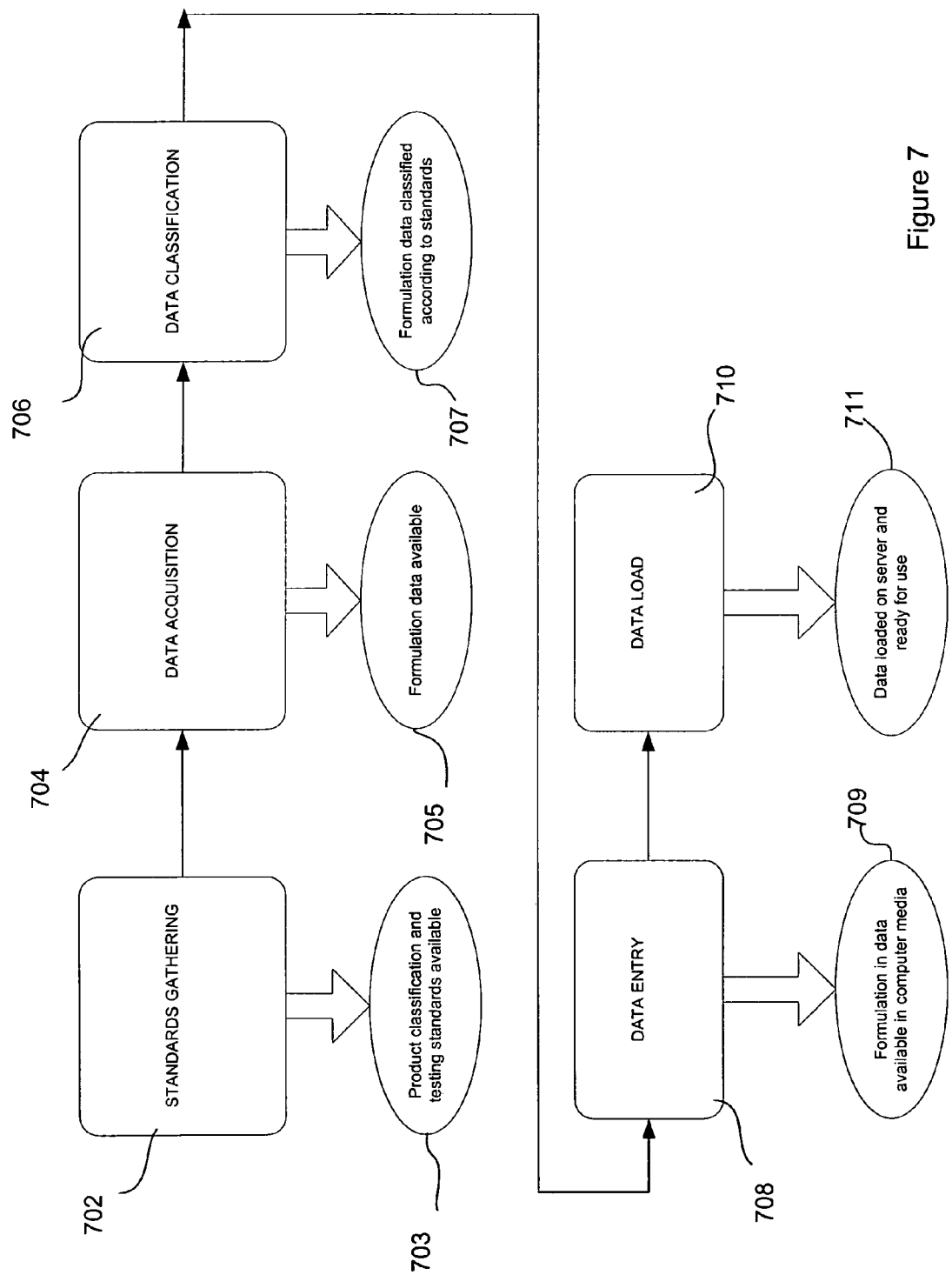
FIG. 7 is a flow diagram of the process for compiling formulations for storage on the system of the present invention.

FIG. 7 provides an example flow diagram of the process of acquiring formulations in accordance with the present invention. The first step (step 702) is a standards gathering process wherein testing protocols available from industry associations and government agencies (such as ASTM) are collected. The output of the gathering process is a classification of the testing standards (step 703). After developing a standard classification system for a given product, Formulation Data sheets, Use guide, Test results and Test methods (various media) are collected from suppliers (step 704) and that formulation data is formatted for storage in a database (step 705). The gathered formulation data is then classified according to the previous designed classification system (steps 706, 707). Where necessary, the standards gathered in prior steps are used to perform manual classification of each formulation, including product data and test results (steps 708, 709). The data is then loaded onto the server and made available for searching (steps 710, 711).

Figure 8:
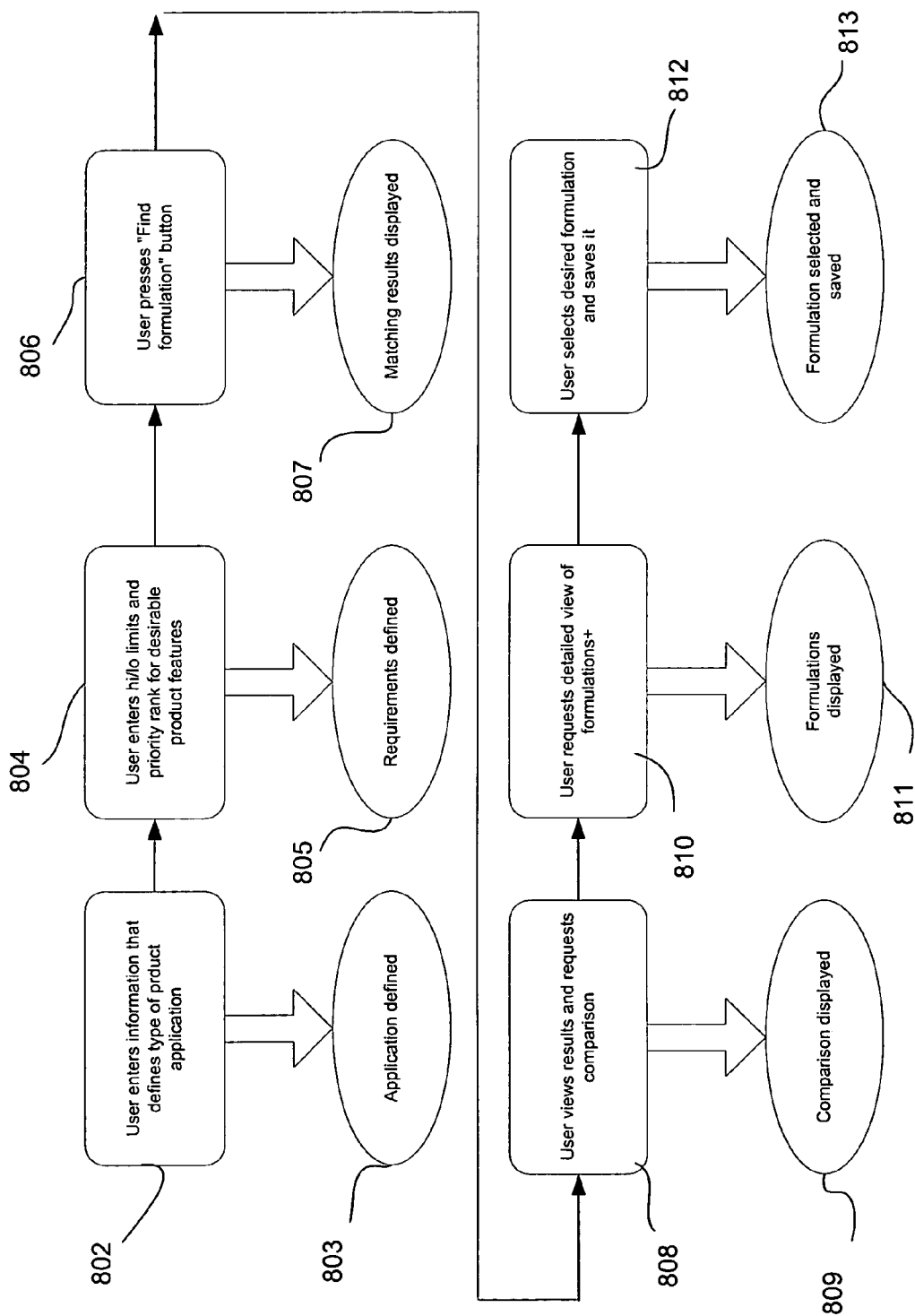
FIG. 8 is a flow diagram of a general process for a user to sort through a formulation database to select a set of matching formulations.

FIG. 8 provides an example flow diagram of the process of a customer stepping through the Formulation Web Site to derive a set of formulations. In a first step (step 802, 803) in the process, the customer enters information that defines the formulation application, e.g., coatings, glue, clock circuits, etc. Thereafter the customer enters limits and prioritizes features in selecting the formulation (step 804). From this, a set of requirements are defined (step 805). These requirements are used to generate a query (step 806) and the matching results are output (step 807). After the results are output, the consumer can view the results and request comparison data (steps 808, 809). The formulation details can be requested and viewed (steps 810, 811). Thereafter, the consumer can select desired ones of the formulations to save for later, purchase components, and etc. (steps 812, 813).

Figure 9:
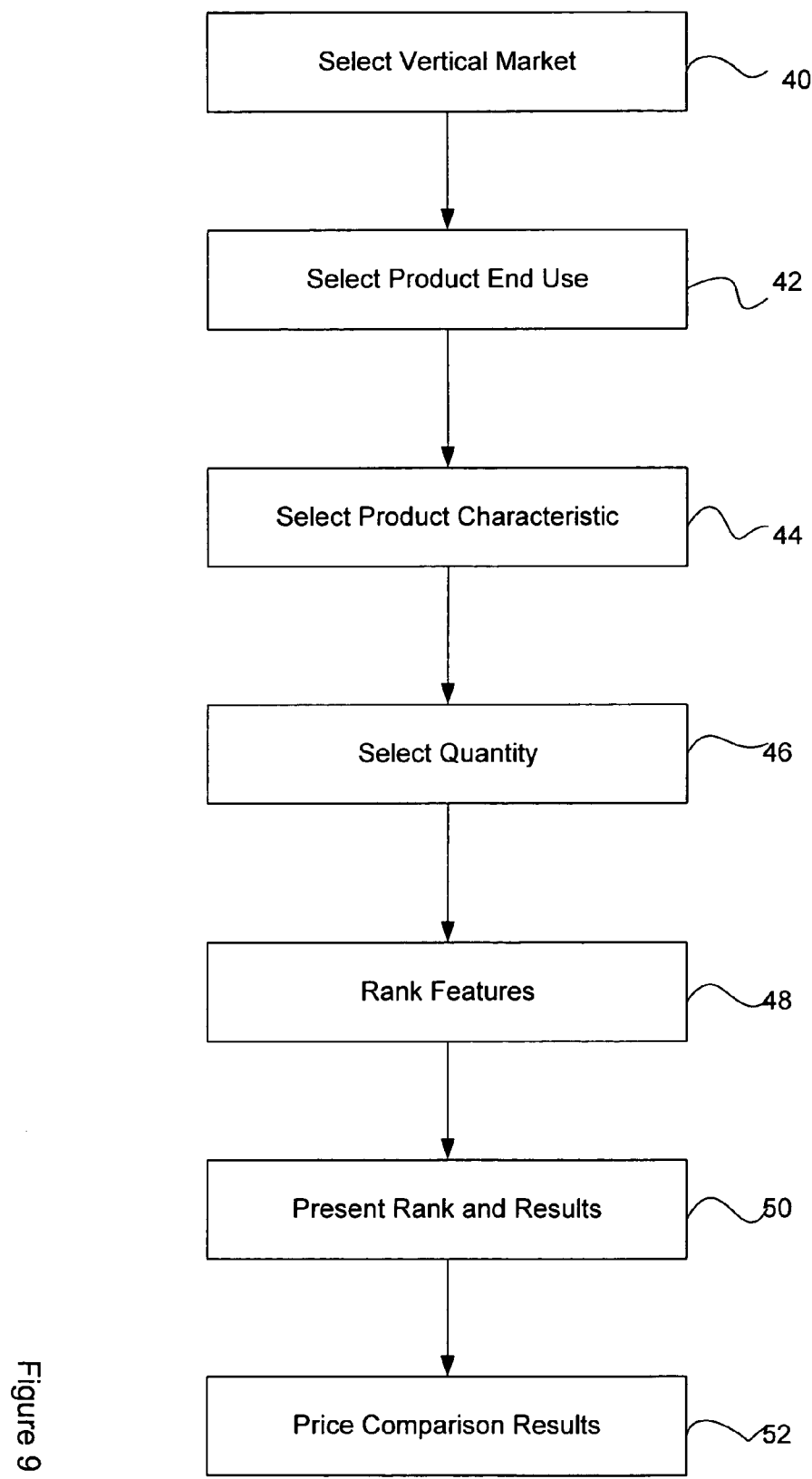
FIG. 9 is a flow chart that illustrates the flow through the system to arrive at a set of formulations in accordance with the illustrative web pages of FIGS. 10–16.
Figure 10:
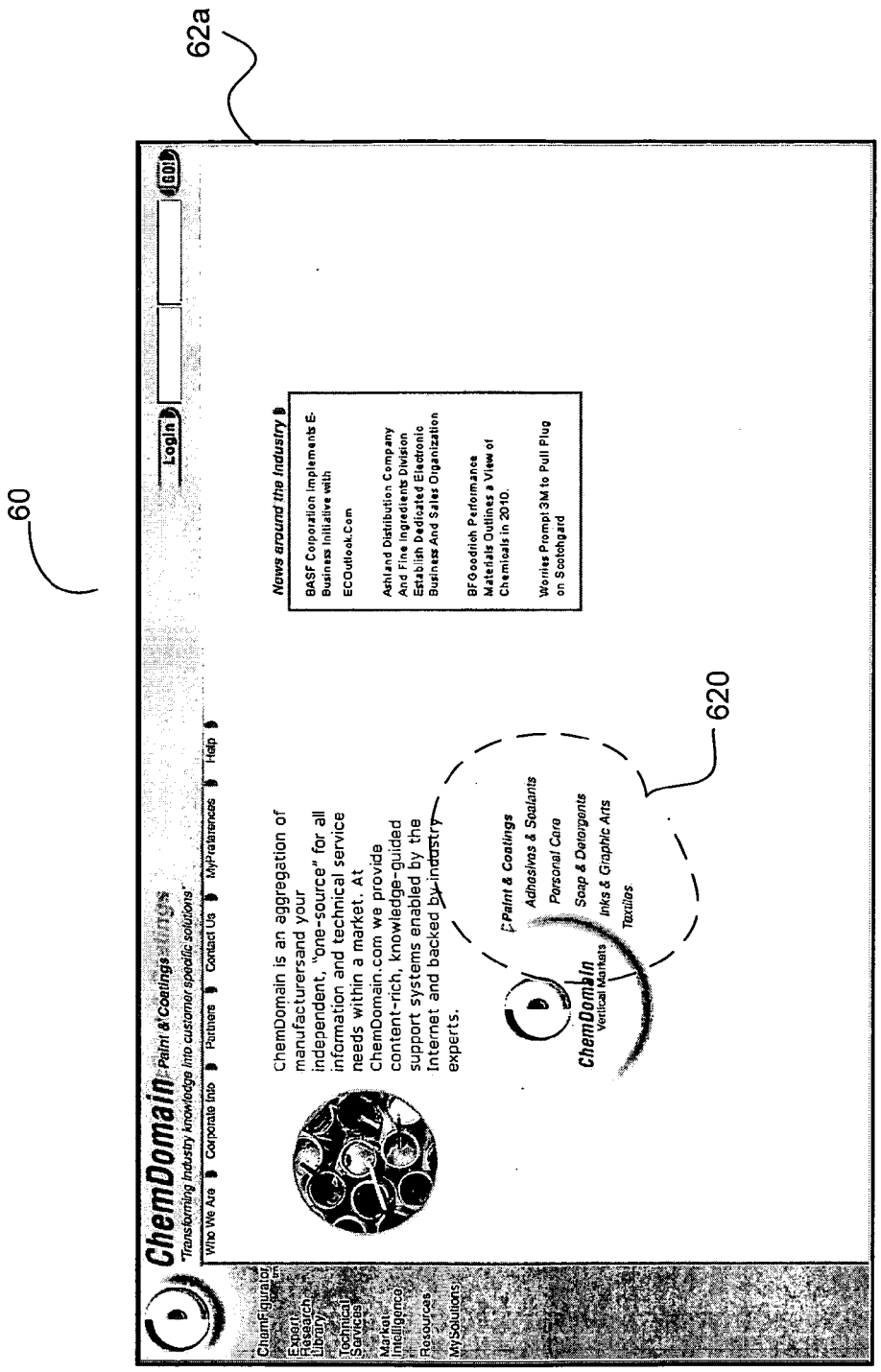
FIG. 10 is an illustration of a user interface for selecting a vertical market to which a set of formulations relate.
Figure 11:
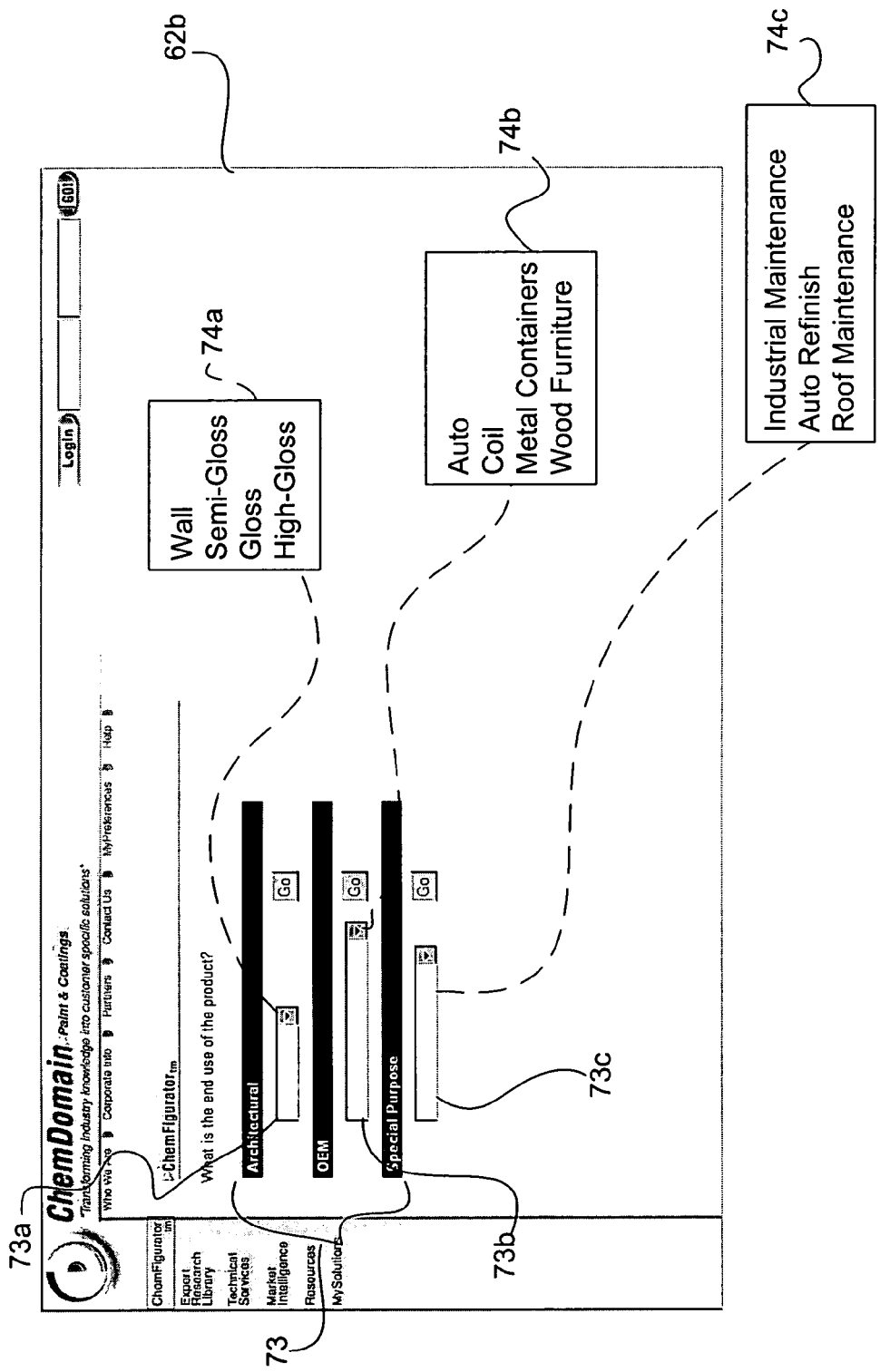
FIG. 11 is an illustration of a user interface for selecting an end use within a vertical market.

FIG. 9 provides an exemplary flow chart of a customer navigation through the system of FIG. 5 to arrive at a set of formulations. This flow chart roughly corresponds to the information and user interface described in connection with FIGS. 10–16. Initially, at step 40, customer 20a selects a vertical market. As shown, in FIG. 10, for example, web site 60 presents a web page 62a wherein a customer 20a may select from one of Paint & Coatings, Adhesives & Sealants, Personal Care, Soap & Detergent, Inks & Graphic Arts, and Textiles. In a different context, for example a computer context, customer 20a would select from a different set of vertical markets. Selection of a vertical market from web page 62 causes system 20b to present web page 62b. Here, in accordance with step 42 of FIG. 5, customer 20a selects a product end use 620. For example, as shown in FIG. 11, under the Paint & Coatings vertical market, the user selects the appropriate end use 73 to further define customer 20a's needs. Each of the end uses 73 has an associated drop down menu of selections. For example, selecting drop down box 73a for Architectural end use 73 presents the selections shown in box 74a from which a customer 20a may further define the end use. For example, customer 20a may select Wall, Semi-Gloss, Gloss, and High-Gloss. Similarly, drop down boxes 73b and 73c, corresponding to OEM and Special Purpose end uses, respectively, have associated selections 74b and 74c, respectively. After making a selection from the appropriate drop down box 73, customer 20a next further defines the selected product characteristics as indicated by step 44 of FIG. 9.

Figure 12:
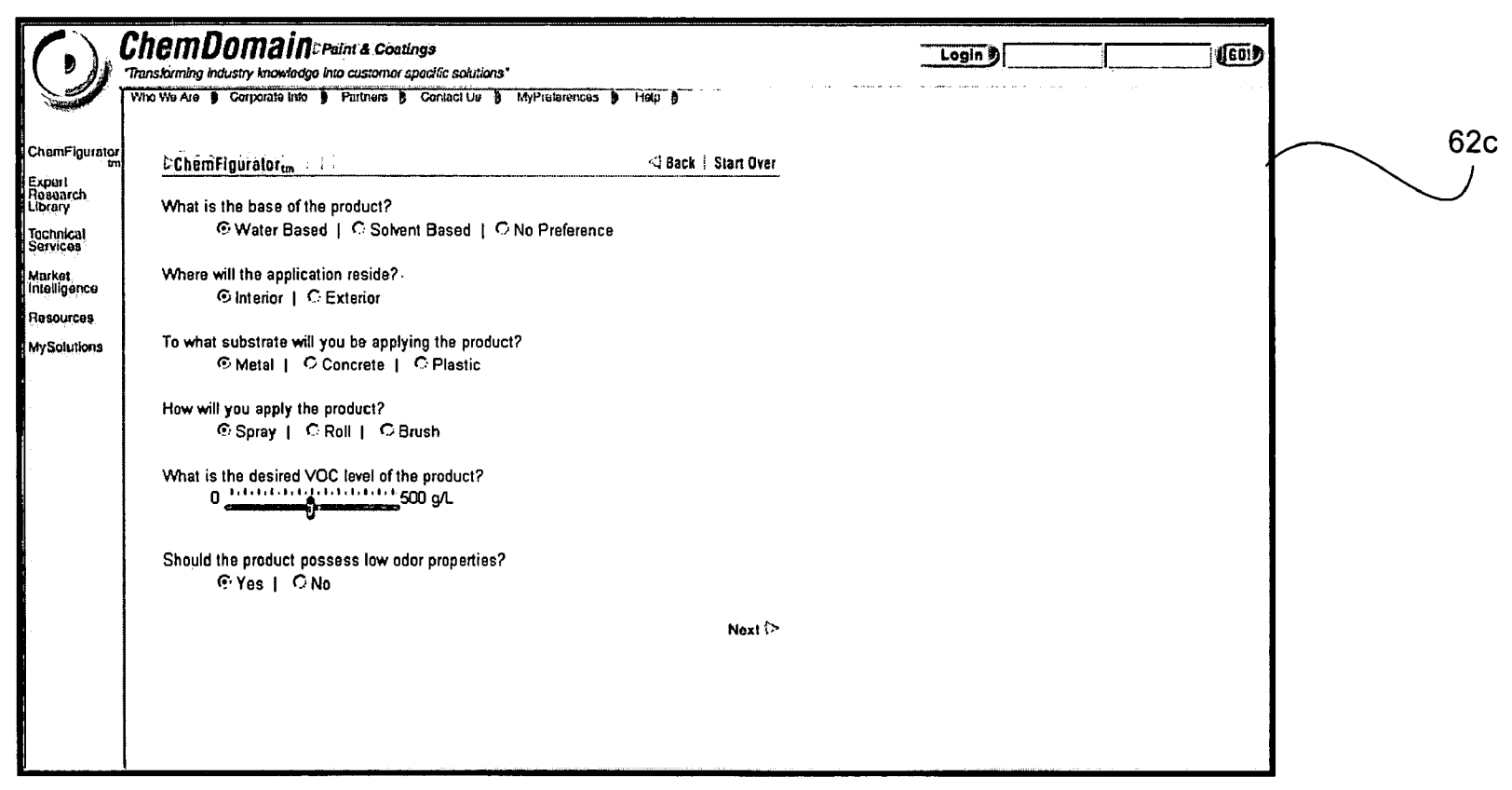

FIG. 12 is an example web page that illustrates one embodiment whereby a customer 20a further defines performance characteristics of the formulation sought. Here, for example, customer 20a is presented with six questions in the form of slide bars and radio buttons. All of these questions are dynamically based on the previously selected end use selected from the previous web page (e.g., web page 62b of FIG. 11). For example, customer 20a may further indicate that the formulation sought is *Water Based*, for *Interior* use, to be applied to *Metal* substrate, with a *Spray* on applicator with a VOC level of about 250 g/L, and should posses low odor qualities. As customer 20a further differentiates the formulation sought, some of the characteristics may not be as significant to customer 20a's needs. Hence, some of the characteristics may be defined according to a more fuzzy logic.

Figure 13:
FIG. 13 is an illustration of a user interface wherein a customer ranks characteristics of formulations sought.
Figure 14:
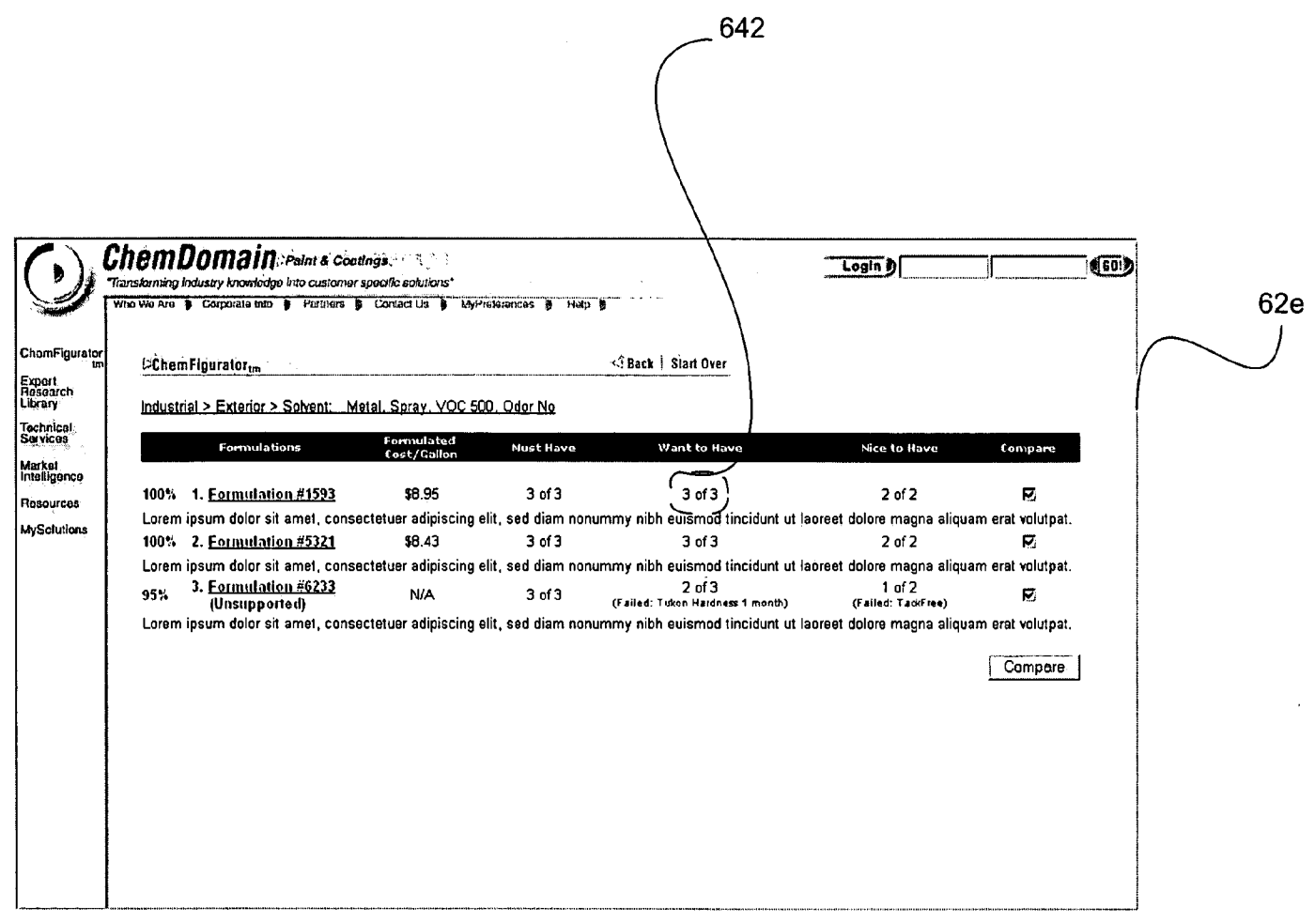
Figure 15:
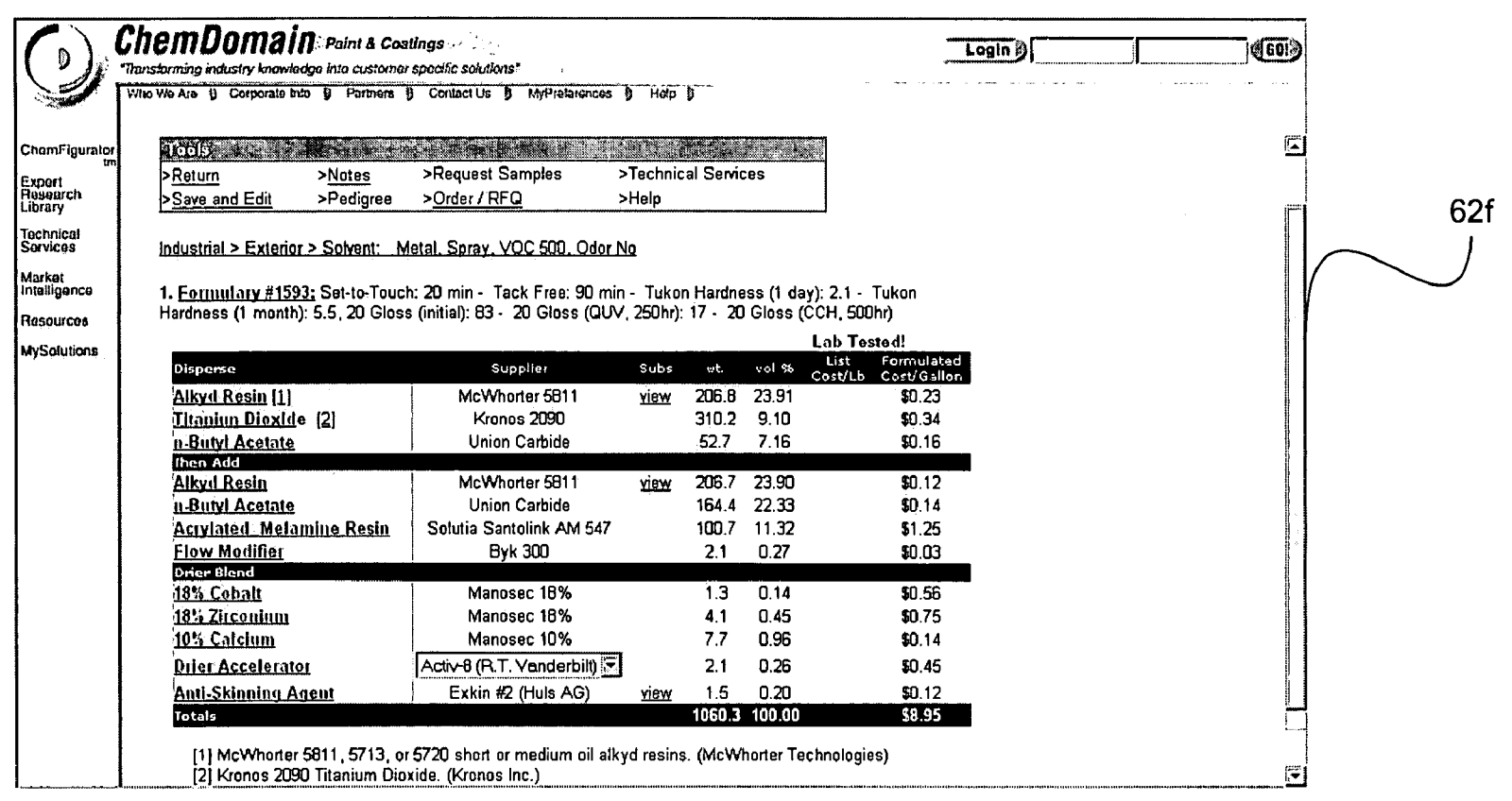

FIG. 13 presents a web page 62d that illustrates a mechanism whereby the user may rank certain of the characteristics of the formulation sought (in accordance with step 48 of FIG. 5). In this example, customer 20a may select certain characteristics and indicate the relative importance of that characteristic to other ones of the characteristics of the formulation sought. For example, customer 20a can set the priority of *Set To Touch* as *Required* and set the priority of other characteristic the same or different such as *Desirable* or *Not Important*. Thereafter and as illustrated by step 50 of FIG. 9, a query is generated to query database 70 (see FIG. 1) to select the set of formulations matching the customer 20a's selections. The results are output according to a ranking as illustrated by web page 62e of FIG. 14. In that output, formulations and unit costs are presented to customer 20a along with the number of set characteristics matched. For example, Formulation 1 had 3 of 3 characteristics that were set to *Desirable*, as indicated by 642. By selecting one of the formulations presented, an additional detailed web page is presented (e.g., web page 62f of FIG. 15). In the detailed web page, the formulation is broken down by components along with suppliers that supply various ones of the components.

Figure 16:
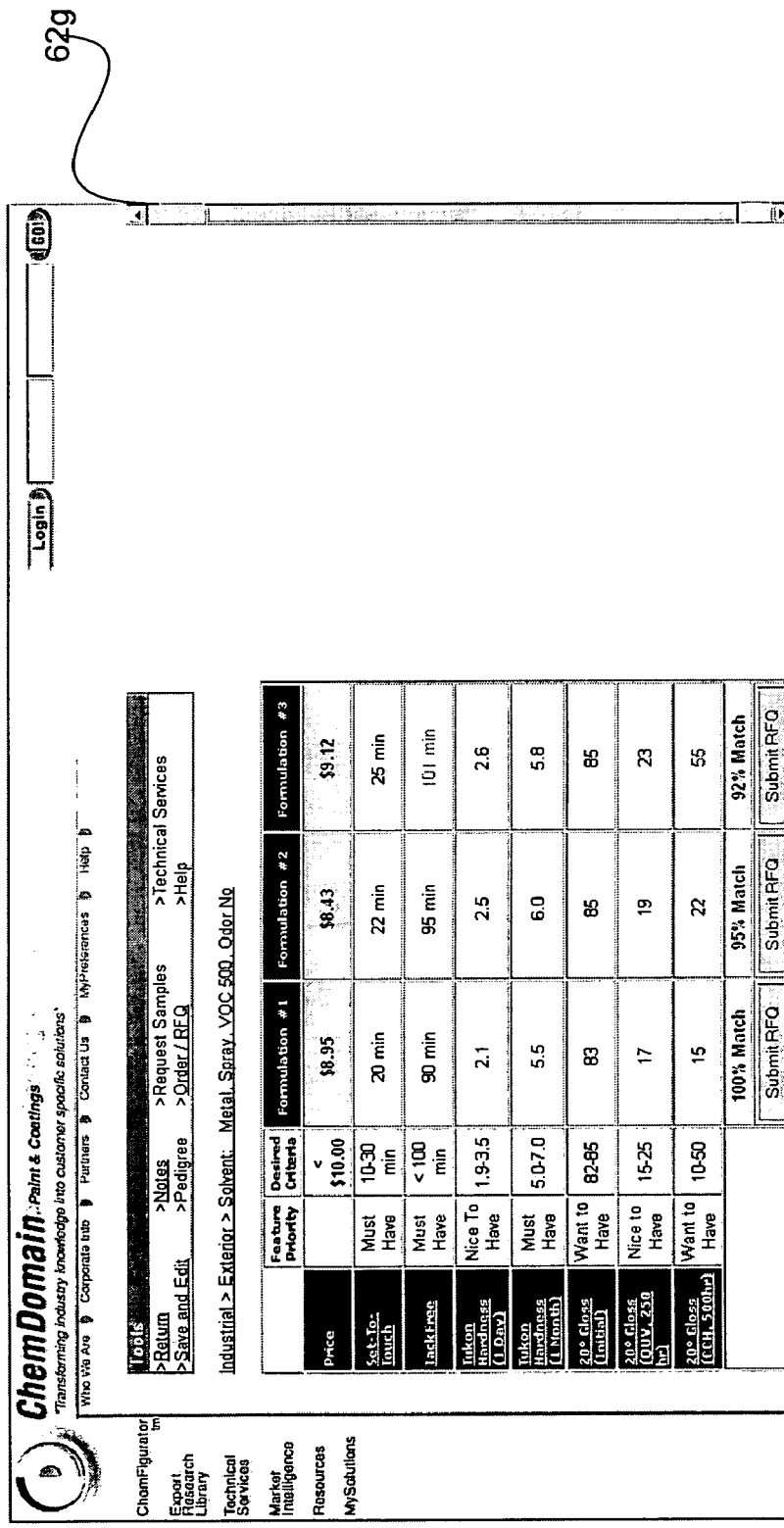
FIG. 16 is an illustration of a user interface for comparing formulations in a side-by-side fashion.

Customer 20a may choose to compare the various formulations that were resulted from the selected inputs. FIG. 16 presents an example web page output 62g that illustrates one such side-by-side comparison. Here, Formulations 1, 2, and 3 are compared to one another along with various characteristics. A unit price may be presented for each that provides an additional basis for comparison.

According to an embodiment of the invention, after a customer or user of the system has used the system to locate formula of interest, the customer can then follow the formulation to build or fabricate the formulation from the components. Using the formulation of FIG. 15 as an example, the customer would disperse the alkyd resin, titanium dioxide, and n-butyl acetate, then add the additional alkyd resin, n-butyl acetate, acrylated melamine resin, and flow modifier, then drier blend the cobalt, zirconium, calcium, drier accelerator, and anti-skinning agent. This starting point formulation could be used for testing purposes, experimentation, manufacture and so on.

According to an aspect of the invention, the starting point formulations can also be used to perform modeling. Stand alone modeling software has been available to run in a WINDOWS Operating System environment such as the Laboratory Module available from BatchMaster Software group of eWorkplace Solutions of Laguna Hills, Calif. Here, the modelling software would be tied to the formulator output. For example, during the product development process, formulators need to achieve certain performance characteristics. As they achieve a certain level of performance, formulators perform lab bench experiments to test how a formulation's performance properties react to changes in ingredients. This trial and error process allows them to fine tune a formulation and establish the best set of properties they can find. Such experiments are performed in a controlled environment, i.e., only one ingredient is changed at a time, and resulting performance properties are recorded. For example, a flat paint formulation may contain ingredients such as: water, solvent, thickener, inert pigment, antifreeze, latex, Titanium Dioxide, and the formulator may have properties goals such as Ph=8.5 to 9.0, KU=95 to 100. One set of experiments may include testing 4 types of thickeners and record the resulting values of Ph and KU.

Most of a chemist's time is spent running those experiments (which includes setting it up, testing, measuring results and documenting them). The model will use statistical regression to predict the performance properties (Ph and KU in our example) associated with additional thickener types by using the original thickeners data points along with the corresponding performance properties. If the regression successfully explains enough of the correlation between those two types of variables (thickener and Ph/KU), the formulator would be able to skip a number of experiments thus saving significant time.

According to an alternative embodiment, the system may generate a list of formulation options or solutions that includes a list of substitute commodity raw materials which are interchangeable within the formulation and "typical" pricing on these commodities.

According to an aspect of the invention, after a set of formulations are selected that met customer 20a qualifications, components of the formulation are available for purchase by the customer. This can be done according to a straight forward purchase at the quoted price, either directly or by way of a distributor, or alternatively according to an auction methodology. It should be appreciated that a customer can also go directly to the set of formulations or a particular formulation by, for example, performing a search on the web site.

According to one auction embodiment, component suppliers provide a price to supply components based on the total amount required. Thus if a component is fifty percent of one formulation and 60% of another, a better price may be offered on the 60% formulation. Because the unit cost of the formulation is a function of the combination of all of the components, the comparison price of the various formulations will depend on the assembled cost of all of the separately priced components.

According to another auction embodiment, specialty ingredients within the formulation are specified as "no equal", but all other ingredients are specific as "as equal". An electronic reverse auction commences in which participants (i.e., suppliers 20a' and/or distributors 20a") bid on individual components within the formulation over a fixed timeframe. Customer 20a is able to observe the bid and see how the formulated cost declines with each lower input price offered. Customer 20a chooses set of distributor(s) 20a" and supplier(s) 20a' for a quarterly contract based upon lowest price and other intangibles (quality of distributor service, etc.). Each distributor 20a" or supplier 20a' will be linked to an electronic order entry interface that each customer 20a will use for future order fulfillment and technical service on an ongoing basis.

The invention will track pricing, purchasing patterns and commodity trends on behalf of its customers 20a in order to alert them when cost improvement opportunities become evident or it has become appropriate to re-bid based on changed market conditions.

Figure 17:
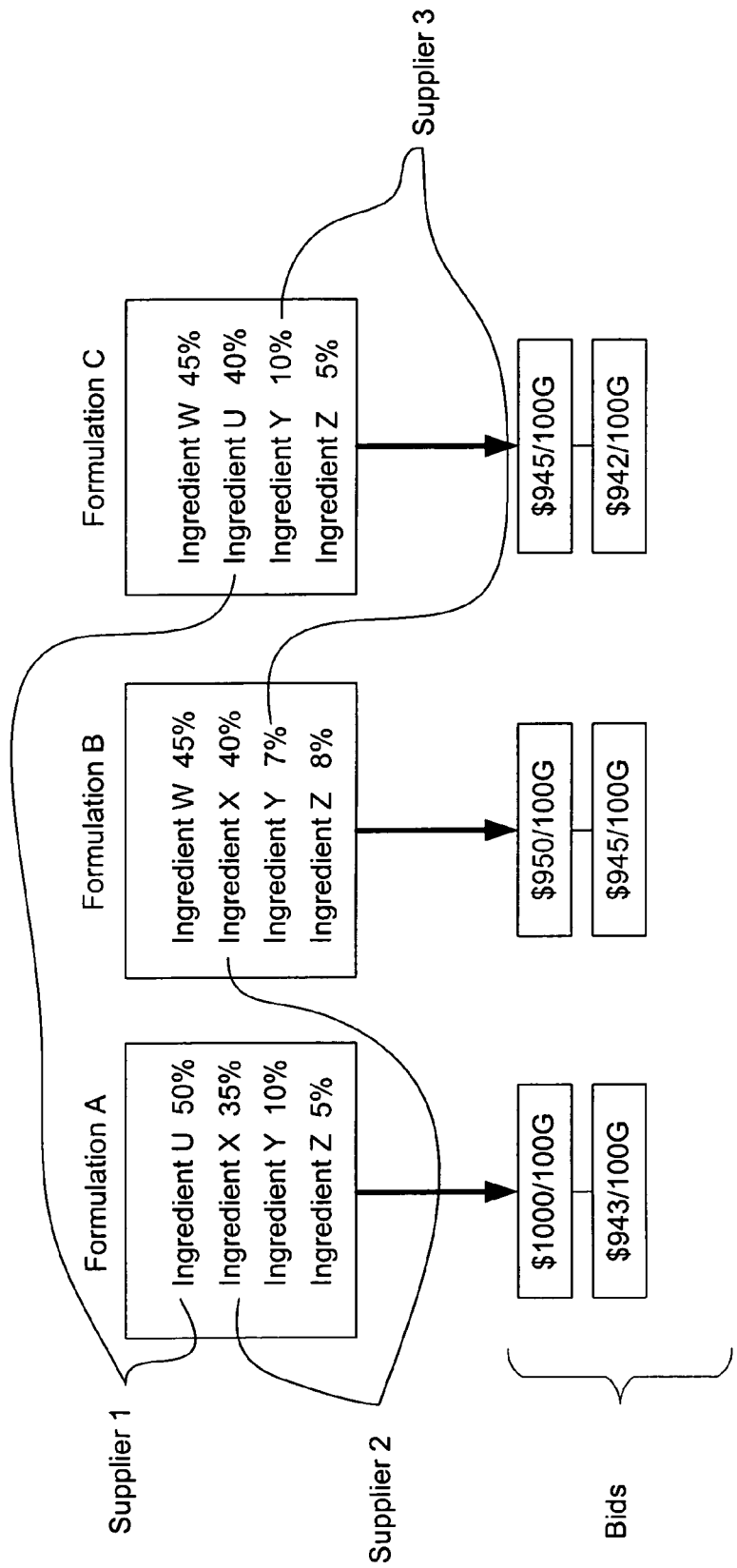
FIG. 17 is an illustration of an auction process in accordance with an aspect of the present invention.

FIG. 17 further illustrates the auction feature in accordance with an aspect of the invention. In this example, a customer 20a is presented with three competing formulations. Each formulation may have slightly different characteristics but each was selected by the system as meeting the customers stated performance specifications. All of the formulations contain similar ingredients. For example, they all contain ingredients Y and Z, albeit in slightly differing amounts. Formulations A and B each contain ingredient X but in slightly different percentage compositions; whereas formulations B and C each contain ingredients W in the same percentage composition. Each of the different ingredients may be supplied by different suppliers 20a'. For example, Supplier 1 supplies U, Supplier 2 supplies X, and Supplier 3 supplies Y. The total price of a given formulation is controlled by the combined price of all of the ingredients. So that the effect of a particular ingredient on the overall price of a particular formulation is a function of its percentage of the composition as well as its price. Hence, if Formulations A or C are accepted by the customer, Supplier 3 will have sold a larger percentage of the formulation than if Formulation B is accepted (10% versus 7%). The same is true for Supplier 1 with respect to Formulations A and C (if Formulation B is sold Supplier 1 makes no contribution to the sale) and Supplier 2 with respect to Formulations A and B.

The dynamics of multiple suppliers 20a' having disparate interests in the overall transaction may operate to change the price of the bids for each of the formulations offered to customer 20a.

While the invention is susceptible to various modifications and alternative constructions, certain illustrated embodiments have been shown in the drawings and accompanying detailed description. It should be understood, however, that there is no intention to limit the invention to the specific constructions disclosed herein. On the contrary, the invention is intended to cover all modifications, alternative constructions, and equivalents falling within the scope and spirit of the invention.

What is claimed is:

1. A method for a supplier of at least one supplier specific specialty component to provide a customer with technical support information for making a supplier specific formulation having certain characteristics over a network-based system so as to permit the customer to make the formulation from the at least one supplier specific specialty component promoted and offered for sale by the supplier to the customer, the method comprising:

providing a computer database comprising promotional information specific to the at least one specialty component, a supplier offer to sell the at least one specialty component and supplier technical support information for making a plurality of product formulations using the at least one specialty component;

classifying in the computer database the plurality of product formulations according to a set of product characteristics for each of said formulations;

receiving over the network from the customer a plurality of inputs indicative of a set of customer preferred characteristics;

presenting over the network to the customer supplier technical support information comprising a plurality of formulation constituent components including the at least one specialty component for each of said plurality of formulations corresponding to said set of characteristics received from the customer so that the customer may select different combinations of said components to be used with the at least one specialty component so as to allow the customer to create different trial formulations;

receiving over the network from the customer another input selecting at least one particular combination of constituent components to be used in combination with the at least one specialty component for use in creating at least one trial formulation;

presenting over the network to the customer technical support information for said at least one trial formulation including performance characteristics for said at least one trial formulation, said performance characteristics being substantially consistent with and supplemental to the customer preferred characteristics;

presenting over the network to the customer the promotional information specific to the at least one specialty component; and presenting over the network to the customer an offer sell the at least one specialty component.

2. The method of claim 1 further comprising the steps of:

receiving over the network from the customer an input initiating modeling of the at least one trial formulation after the performance characteristics have been presented over the network to the customer;

presenting over the network to the customer a modeling of the at least one trial formulation so as to simulate the actual performance of the formulation including changes in the performance with changes in the constituent components used in combination with the at least one specialty component.

3. The method as recited in claim 1 further comprising the step of presenting over the network to the customer characteristics of the other components which may be used in combination with the at least one specialty component to create said at least one trial formulation including the manufacturers and prices of said other components.

4. The method according to claim 3 further comprising the step of presenting over the network to the customer an offer to sell the other components which may be used in combination with the at least one specialty component.

5. The method of claim 1 wherein the at least one specialty component comprises a specialty chemical component.

6. The method of claim 1 wherein the at least one specialty component comprises an electronic circuit.

7. The method of claim 1 wherein the step of presenting over the network to the customer technical support information includes the identification of substitutes for the other components which may be used in combination with the at least one specialty component in creating the at least one trial formulation.

8. The method of claim 1 further comprising:
receiving over the network from the customer a request for a list of interchangeable substitutes for at least one of the constituent components used in combination with the at least one specialty component in the at least one trial formulation; and
presenting over the network to the customer the list of interchangeable substitutes, each of the interchangeable substitutes providing substantially the same performance characteristics for the at least one trial formulation.

9. The method of claim 8 further presenting over the network to the customer an offer to sell each of said interchangeable substitutes.

10. The method of claim 1 further comprising:
receiving over the network from the customer a request that at least one trial formulation saved by the supplier for subsequent access by the customer over the network; and
storing the at least one trial formulation for access by the customer over the network.

11. An Internet-based method for providing supplier technical support information to a customer for use in selling at least one of the plurality of constituent components of at least one formulation used in making at least a portion of a product, the constituent components comprising at least one supplier specific specialty component promoted and offered for sale by a supplier who provides the technical support including the at least one formulation, the method comprising the acts of:
providing a computer database comprising promotional information concerning the at least one specialty component, an offer by the supplier to sell the at least one specialty component, and supplier technical support information comprising formulations having a plurality of constituent components including the at least one specialty component offered for sale by the supplier and characteristics of the formulations;
accepting an input from a customer over the Internet indicative of customer preferred characteristics of a desired product formulation;
selecting from formulations in the computer database matching the customer preferred characteristics of the desired product formulation;
providing an output to the customer over the Internet indicative of selected formulations and technical support information comprising the plurality of constituent components including the at least one specialty component so as to provide the customer with the opportunity to select between different combinations of constituent components in creating different trial formulations using the at least one specialty component;
accepting another input from the customer over the Internet selecting a particular combination of constituent components to be used with the at least one specialty component for creating at least one trial formulation;
providing another output to the customer over the Internet of technical support information including performance characteristics for said at least one trial formulation, said performance characteristics being substantially consistent with and supplemental to the customer preferred characteristics;
providing a further output to the customer over the Internet representing the promotional information concerning the at least one specialty component; and
providing a still further output to the customer over the Internet indicative of an offer by the supplier to sell the at least one specialty component.

12. The method as recited in claim 11 further comprising the acts of:
accepting a further input from the customer over the Internet initiating modeling of the at least one trial formulation after the performance characteristics of the at least one trial formulation have been provided to the customer;
providing an output to the customer over the Internet modeling the at least one trial formulation so as to simulate the actual performance characteristics of the at least one trial formulation including changes in the performance with changes in the constituent components used with the at least one specialty component.

13. The method according to claim 11 further comprising the act of providing another output to the customer over the Internet comprising characteristics of the constituent components used with the at least one specialty component to create said at least one trial formulation including the manufacturer and price thereof.

14. The method of claim 11 wherein the at least one specialty component comprises a specialty chemical component.

15. The method of claim 11 wherein the at least one specialty component comprises an electronic circuit.

16. The method of claim 11 wherein the act of providing a data base comprises a classification database comprising a hierarchical data structure wherein nodes in the hierarchical structure represent functional characteristics of a class of formulations.

17. The method of claim 13 further comprising the act of providing another output to the customer over the Internet comprising an offer to sell the constituent components used with the at least one specialty component to create said at least one trial formulation.

18. The method of claim 11 further comprising the acts of:
accepting another input from the customer over the Internet requesting a list of interchangeable substitutes for at least one of the constituent components to be used in combination with the at least one specialty component in the at least one trial formulation; and
providing an output to the customer over the Internet comprising the list of interchangeable substitutes, each of said substitutes providing substantially the same performance characteristics for the at least one trial formulation.

19. The method of claim 18 further comprising the act of providing another output to the customer over the Internet offering to sell each of the interchangeable substitutes.

20. The method of claim 11 further comprising the acts of:
accepting another input from the customer over the Internet requesting that at least one trial formulation be saved by the supplier for future access by the customer over the Internet; and
storing the at least one trial formulation for future access by the customer over the Internet.

21. An Internet-based method for promoting and offering for sale supplier specific specialty components by providing supplier technical support to a customer of the specialty components offered for sale by the supplier for use by a customer in selecting constituent components for making a formulation having the desired characteristics, said method comprising the acts of:
providing a computer database of formulations and characteristics of said formulations wherein each of the formulations comprises a plurality of constituent components and one of said constituent components comprises a specialty component offered for sale by the supplier, promotional information concerning the specialty component and an offer to sell the specialty component;
outputting to the customer over the Internet the promotional information concerning the specialty components;
outputting to the customer over the Internet an offer to sell the specialty components;
accepting input from the customer over the Internet indicative of customer desired characteristics of at least one of said formulations in the database;
selecting a plurality of formulations in the database including the specialty component and matching said customer desired characteristics;
outputting to the customer over the Internet supplier technical support information for the making of the selected plurality of formulations including the identification of at least one specialty component for each of the plurality of formulations and information concerning the other constituents which may be combined with the at least one specialty component;
accepting an additional input from the customer over the Internet selecting particular combinations of specialty components and other constituents based on the technical support information so as to create a plurality of trial formulations, each of said plurality of trial formulations comprising a different specialty component;
outputting to the customer over the Internet additional technical support information including performance characteristics for said selected trial optional formulations, said performance characteristics being substantially consistent with and supplemental to the customer desired characteristics.

22. The method of claim 21 further comprising the act of accepting input from the customer over the Internet indicative of an order to purchase the at least one specialty component and at least one of the other constituent components.

23. The method as recited in claim 21 wherein the act of outputting to the customer technical support information of the different trial formulations includes the characteristics of the other components which may be combined with the at least one specialty component in each of the trial formulations including the manufacturer and price of each of the other components.

24. The method of claim 21 wherein the at least one specialty component comprises a specialty chemical component.

25. The method of claim 21 wherein the at least one specialty component comprises an electronic circuit.

26. The method of claims 21 further comprising the acts of:
accepting an input from the customer over the Internet initiating modeling of at least one of the trial formulations after the performance characteristics have been outputted to the customer;
outputting to the customer the a modeling of the at least one of the trial formulations including changes in the performance with changes in the other components used in combination with the at least one specialty component.

27. The method of claim 21 wherein the act of outputting o the customer technical support information for making the selected plurality of formulations includes the identification of substitutes for the other components used in the selected plurality of formulations.

28. The method of claim 21 further comprising the acts of:
accepting an input from the customer over Internet requesting a list of interchangeable substitutes for at least one of other constituents in at least one of the plurality of trial formulations; and
outputting to the customer over the Internet the list of interchangeable substitutes, each of said substitutes providing substantially the same performance characteristics for the at least one of the plurality of trail formulations.

29. The method of claim 28 further comprising the act of outputting to the customer over the Internet an offer to sell each of the interchangeable substitutes.

30. The method of claim 21 further comprising the acts of:
accepting an input from the customer over the Internet requesting that at least one trial formulation be saved by the supplier for future access by the customer over the Internet; and
storing the at least one trial formulation for future access by the customer over the Internet.

31. An Internet-based method for providing technical support by a supplier of a specialty component promoted and offered for sale to a customer for the formulation of a product comprising a plurality of constituent components including the specialty component, said method comprising the acts of:
accepting from a supplier information indicative of a plurality of formulations and characteristic data for the formulations in addition to technical support information for making the formulations including a plurality of constituent components for each of the formulations wherein at least one of the components is the specialty component offered for sale by the supplier to the customer;
categorizing the data based on performance characteristics of the formulations;
storing the formulations including the technical support information in a computer database such that the formulations are retrievable from the database on the basis of the categorization;
accepting a request from said supplier over the Internet comprising a redirected request for the customer for said formulations and technical support information based on the supplier specifying performance criteria;

providing formulations and technical support information for making the formulations including identification of at least one specialty component and a choice of the other constituent components to be combined therewith substantially consistent with said performance criteria back to the supplier over the Internet including the specialty component;

accepting a request from the supplier over the Internet comprising a redirected request for a customer choosing at least one particular combination of the other constituent components and the at least one specialty component in at least one of the formulations to obtain at least one trial formulation;

providing performance characteristics for each said at least one trial formulation back to the supplier over the Internet, said performance characteristics for each said at least one trial formulation substantially satisfying and supplementing the performance criteria specified by the supplier;

offering said specialty component for sale over the Internet; and providing promotional information concerning the specialty component so as to promote the sale thereof.

32. The method as recited in claim 31 wherein the formulation data is separately maintained in the database based on the supplier.

33. The method of claim 31 wherein the supplier information comprises a file of information received from the supplier by way of the Internet.

34. The method according to claim 33 wherein the file is transferred in an XML format.

35. A method of a customer accessing information including technical support information for promoting the sale of a specialty component being offered for sale by a supplier including a formulation for making a formulation from the specialty component used with other specialty components comprising the acts of:

specifying a set of characteristics that a formulation should possess;

transmitting to a server over an internet said set of characteristics whereby said server can match selected ones of formulations stored in a formulation data store and transmitting the selected ones of formulations and technical support information for making the selected ones of the formulations including the specialty component and at least one other constituent component thereof and possible substitutes therefore back to the customer;

receiving the matching selected ones of formulations and the technical support information for making the selected ones of the formulations including the other constituent components and possible substitutes therefore;

selecting a plurality of said formulations representing different combinations of the other constituent components and substitutes therefore to create a plurality of trial formulations substantially conforming with the set of characteristics that a formulation should possess;

transmitting to a server over the internet performance characteristics that each said at least one trial formulation possesses, said additional performance characteristics being substantially consistent with and supplemental to the set of characteristics that a formulation should possess;

receiving promotional information concerning the specialty component;

receiving an offer to sell the specialty component from the supplier; and ordering the specialty component from the supplier.

36. The method as recited in claim 35 wherein the formulations comprise chemical formulations.

37. The method as recited in claim 35 wherein the formulations comprise electrical formulations.

38. The method of claim 35 further comprising the acts of:

transmitting to a server over the internet requesting a list of interchangeable substitutes for at least one of the other constituent components in at least one of the trial formulations, receiving a list of interchangeable substitutes providing substantially the same performance characteristics for the at least one of the trial formulations.

39. The method of claim 38 further comprising the act of receiving an offer to sell each of the interchangeable substitutes.

40. The method of claim 35 further comprising the acts of:

transmitting to a server over the internet a request that at least one of the trial formulations be saved for future access over the internet; and storing in the server the at least one of the trial formulations for futre access over the internet.

41. A network-based method for a supplier of specialty components to provide promotional information about the specialty components including technical support information to a customer for making a formulation from a plurality of constituent components wherein at least one of the components is a specialty component offered for sale to the customer by the supplier comprising the acts of:

providing a computer database of specialty component promotional information including formulations wherein the each of the formulations comprise constituent components including at least one specialty component being offered for sale by the supplier;

accepting input from the customer over the network indicative of characteristics of a plurality of said formulations;

selecting said plurality of said formulations in the database matching the characteristics;

providing an output to the customer over the network of said formulations selected and technical support information for making said formulations selected including at least one specialty component being offered for sale and a list of other constituent components for each of said formulations;

accepting input from a customer over the network selecting more than one of said formulations selected as trial formulations;

providing an output to the customer over the network of performance characteristics for each of said trial formulations, said performance characteristics being substantially consistent with and supplemental to the characteristics of the customer input;

providing an output to the customer over the network of additional promotional information concerning the specialty components being offered for sale; and providing an output to the customer over the network offering the specialty components for sale to the customer.

42. The method of claim 41 further comprising the acts of:
accepting input from the customer over the network initiating modeling of at least one of said trial formulations after the performance characteristics have been outputted to the customer;
providing an output to the customer over the network a modeling of the at least one the trial formulations so as to simulate the performance thereof including changes in the performance with changes in the other constituent components used in combination with the at least one specialty component.

43. The method of claim 41 further comprising the acts of:
accepting input from the customer over the network requesting a list of interchangeable substitutes for at least one of the other constituent components in at least one of the trial formulations; and
providing an output to the customer over the network comprising said list of interchangeable substitutes.

44. The method of claim 43 further comprising the act of providing an output to the customer over the network comprising the characteristics of the interchangeable substitutes including manufacturer and price.

45. The method of claim 41 wherein the components comprise chemical constituents of a chemical formulation.

46. The method of claim 41 wherein the components comprise electronic elements of an electronic circuit formulation.

47. The method of claim 44 wherein the performance characteristics outputted to the customer for each of said trial formulations remain constant using different interchangeable substitutes.

48. The method of claim 41 further comprising:
accepting input from the customer over the network a request for a list of interchangeable substitutes for at least one of the other constituent components for at least one of the trial formulations; and
providing an output to the customer over the network comprising the list of interchangeable substitutes wherein each of the interchangeable substitutes provides substantially the same performance characteristics for the at least one of the trial formulations.

49. The method of claim 48 comprising providing an output to the customer over the network comprising an offer to sell the interchangeable substitutes.

50. The method of claim 41 further comprising the acts of:
accepting input from the customer over the network requesting that at least one of the trial formulations be saved for future access by the customer;
storing the at least one of the trial formulations for future access by the customer over the internet.

51. A network-based method of obtaining technical support and promotional information stored in a server by a supplier of specialty components for use by a customer for making formulations including at least one specialty component and other constituent components wherein the at least one specialty component is offered for sale by the supplier comprising:
specifying by the customer a set of characteristics that a formulation should possess;
transmitting from the customer over a network said set of characteristics in a form such that said server can match the product formulations stored in said server to said set of characteristics;
receiving by the customer over the network the matched formulations and technical support information for making the matched formulations including the identification of the specialty component and a plurality of other constituent components thereof;
transmitting from the customer over the network a selection of a plurality matched formulations so as to identify different trial formulations among the matched formulations;
receiving by the customer over the network performance characteristics for each of said different trial formulations, said performance characteristics being substantially consistent with and supplemental to said set of characteristics transmitted from the customer;
receiving by the customer promotional information concerning the specialty component and promoting the sale of the specialty component; and
receiving by the customer an offer to sell the specialty component.

52. The method of claim 51 further comprising;
transmitting from the customer over the network a request for a list of interchangeable substitutes for at least one of the other constituent components in one of said trial formulations;
receiving by the customer the list of interchangeable substitutes and an offer to sell each of said interchangeable substitutes.

53. The method of claim 51 wherein the transmitting and receiving over the network is over the Internet.

54. The method of claim 52 wherein wherein the list of interchangeable substitutes identifies manufacturers other than the supplier of the specialty components and prices for the interchangeable substitutes.

55. The method of claim 51 further comprising transmitting over the network an order to purchase at least the specialty component.

56. The method of claim 51 wherein the constituent components comprise chemical constituents and the at least one of the formulations comprises a chemical formulation.

57. The method of claim 51 wherein the constituent components comprise electronic elements and the at least one of the formulations comprises an electronic circuit.

58. The method of claim 51 further comprising:
transmitting from the customer over the network a request for a list of interchangeable substitutes for at least one of the other constituent components for at least one of the trial formulations; and
receiving by the customer over the network the list of interchangeable substitutes wherein each of the interchangeable substitutes provides substantially the same performance characteristics for the at least one of the trial formulation.

59. The method of claim 58 further comprising receiving by the customer over the network an offer to sell the interchangeable substitutes.

60. The method of claim 51 further comprising:
transmitting from the customer over the network a request that at least one of the trial formulations be saved for future access by the customer; and
storing the at least one of the trial formulations in the server for access by the customer over the network.

61. A network-based method for a supplier to promote the sale of a specialty component by providing promotional information concerning the specialty component and technical support information to a customer for the manufacture of at least a portion of products from different formulations comprising the specialty component and other various constituent components, said method comprising the acts of:
providing a computer database of promotional information concerning the specialty component and technical support information for said different formulations comprising said various constituent components including said specialty component for making at least a portion of said products;

providing an output to the customer over the network of said promotional information concerning the specialty component;

providing an output to the customer over the network of an offer to sell the specialty component;

accepting input from a customer over the network indicative of a product and a set of characteristics of at least one of said different formulations for making at least a portion of one of said products;

selecting at least one of said different formulations for making at least a portion of one of said products in the database matching said input; and providing an output to the customer over the network of technical support information for making the at least one of said different formulations selected including the identification of the specialty component and the opportunity to use the other of said various constituent components in different combinations;

accepting input from the customer selecting at least one of said different combinations of the other of said various constituent components to be used with the specialty component so as to create at least one trial formulation; and providing to the customer over the network performance characteristics for each said at least one trial formulation, said performance characteristics being substantially consistent with and supplemental to said set of characteristics accepted from the customer.

62. The method of claim 61 wherein the at least one of the formulations selected is a chemical formulation, the technical support information including the various constituent components provided includes a plurality of chemical components for making the chemical formulation and said specialty component comprises a specialty chemical.

63. The method of claim 62 wherein the technical support information includes the percentage of each of the various constituent components for the at least one of the selected chemical formulations.

64. The method of claim 63 wherein the technical support information includes the order in which the chemical components are added to make the at least one of the selected chemical formulations.

65. The method of claim 64 wherein the technical support information includes process information for combining the chemical components.

66. The method of claim 62 further comprising the act of accepting an input from the customer over the network of an order to purchase the specialty chemical.

67. The method of claim 62 wherein the input and the output are transmitted over the internet.

68. The method of claim 61 wherein the at least one of the formulations selected is an electronic circuit, the technical support information includes a schematic of the electronic circuit including a plurality of electronic components and the specialty component is an integrated circuit.

69. The method of claim 68 further comprising the step of receiving an input from the customer over the network indicative of an order to purchase the integrated circuit.

70. The method of claim 68 wherein the input and the output are transmitted over the internet.

71. The method of claim 61 wherein the at least one of the formulations selected is a pharmaceutical product and the technical support information provided is for making the pharmaceutical product from the constituent components.

72. The method of claim 61 wherein the at least one of the formulations selected is an industrial gas and the technical support information provided is for making the industrial gas from the constituent components.

73. The method of claim 61 wherein the at least one of the formulations selected is a recipe for food and the technical support information provided is for making the food including the constituent components.

74. The method of claim 61 further comprising the step of accepting an input from the customer over the network indicative of an order to purchase the specialty component.

75. The method of claim 74 wherein the input and the output are transmitted over the internet.

76. The method of claim 61 wherein the promotional information includes specialty component literature.

77. The method of claim 61 wherein the promotional information includes advertising.

78. The method of claim 61 further comprising the acts of:
accepting input from the customer over the network comprising a request for a list of interchangeable substitutes for at least one of the other various constituent components for the at least one trial formulation; and
providing an output to the customer over the network comprising the list of interchangeable substitutes wherein each of the substitutes provides substantially the same performance characteristics for the at least one trial formulation.

79. The method of claim 78 further comprising the act of providing an output to the customer over the network comprising an offer to sell each of the interchangeable substitutes.

80. The method of claim 61 further comprising the acts of:
accepting input from the customer over the network requesting that the at least one trial formulation be saved for future access by the customer over the network; and
storing the at least one trial formulation for future access by the customer over the network.

81. A network-based method of obtaining information from a supplier promoting the sale of a specialty component for use in a formulation including technical support information from the supplier for a customer to make at least a portion of products using different formulations comprising the specialty component and other various constituent components including the specialty component being offered for sale by the supplier and promotional information from the supplier concerning the specialty component, said method comprising the acts of:
receiving by the customer over the network promotional information from the supplier concerning the specialty component;
receiving by the customer over the network an offer by the supplier to sell the specialty component;
specifying a product and a set of characteristics by the customer that a formulation for making at least a portion of a product should possess;
transmitting from the customer to a server over the network said specified product and said specified set of characteristics that the formulation for making at least a portion of the product should possess such that said server can match said specified product and said specified set of characteristics to the characteristics corresponding to at least one formulation for making at least a portion of one product stored in said server;

receiving by the customer over the network technical support information for the matched at least one formulation for making at least a portion of one product stored in said server including identification of the specialty component and the opportunity to use the others of the constituent components including in different combinations with the specialty component;

transmitting from the customer to a server the selection of at least one of said different combinations of the others of the constituent components to be used with the specialty component to create at least one trial formulation; and receiving by the customer over the network performance characteristics for each said at least one of the trial formulation, said performance characteristics being substantially consistent with and supplemental to said set of characteristics specified by the customer.

82. The method of claim 81 wherein the at least one formulation is a chemical formulation, the technical support information received is for making the chemical formulation from a plurality of identified constituent chemical components, and said specialty component is a specialty chemical.

83. The method of claim 82 wherein the technical support information received includes the percentage of each of the identified chemical constituent components for the at least one formulation.

84. The method of claim 83 wherein the technical support information received includes the order in which the chemical constituent components are added to make the at least one formulation.

85. The method of claim 84 wherein the technical support information includes process information for combining the constituent components.

86. The method of claim 82 further comprising the act of transmitting from the customer over the network an output indicative of an order to purchase the specialty component.

87. The method of claim 82 wherein the set of characteristics are transmitted and the technical support information is received over the internet.

88. The method of claim 81 wherein the at least one formulation is an electrical circuit, the technical support information received includes a schematic of an electronic circuit and specialty component is an integrated circuit.

89. The method of claim 88 further comprising the act of transmitting from the customer over the network an output indicative of an order to purchase the integrated circuit.

90. The method of claim 81 wherein the set of characteristics are transmitted and the technical support information are received over the internet.

91. The method of claim 81 wherein the at least one formulation is a pharmaceutical product and the technical support information received is for making the pharmaceutical product form the constituent components.

92. The method of claim 81 wherein the at least one formulation is an industrial gas and the technical support information received is for making the industrial gas from the constituent components.

93. The method of claim 81 wherein the at least one formulation is a recipe for food and the technical support information received is for the food including the constituent components.

94. The method of claim 81 further comprising the act of transmitting from the customer over the internet an output indicative of an order to purchase the specialty component.

95. The method of claim 81 wherein the product, the set of characteristics and the technical support information are transmitted over the internet.

96. The method of claim 81 wherein the promotional information includes specialty component literature.

97. The method of claim 81 wherein the promotional information includes advertising.

98. The method of claim 81 further comprising the acts of:
transmitting from the customer to a server a request for a list of interchangeable substitutes for at least one of the other various constituent components in the at least one trial formulation;
receiving by the customer over the network the list of interchangeable substitutes wherein each of the substitutes provides substantially the same performance characteristics for the at least one trial formulation.

99. The method of claim 98 further comprising the act of receiving by the customer over the network an offer to sell each of the interchangeable substitutes.

100. The method of claim 81 further comprising the acts of:
transmitting from the customer to a server over the network a request that the at least one trial formulation be saved for future access by the customer; and
storing the at least one trial formulation on the server for future access by the customer over the network.

* * * * *

US007113919C1

(12) INTER PARTES REEXAMINATION CERTIFICATE (1030th)

United States Patent
Norris et al.

(10) Number: US 7,113,919 C1
(45) Certificate Issued: Jan. 16, 2015

(54) SYSTEM AND METHOD FOR CONFIGURING PRODUCTS OVER A COMMUNICATIONS NETWORK

(75) Inventors: Eric W. Norris, Wynnewood, PA (US); Walter C. DeSouza, Bryn Mawr, PA (US)

(73) Assignee: Etool Patent Holdings Corp., Irving, TX (US)

Reexamination Request:
No. 95/000,533, Feb. 11, 2010

Reexamination Certificate for:
Patent No.: 7,113,919
Issued: Sep. 26, 2006
Appl. No.: 09/643,841
Filed: Aug. 22, 2000

Related U.S. Application Data

(60) Provisional application No. 60/185,954, filed on Feb. 29, 2000.

(51) Int. Cl.
*G06Q 30/00* (2012.01)
*G06Q 30/06* (2012.01)

(52) U.S. Cl.
CPC ........ *G06Q 30/0621* (2013.01); *G06Q 30/0631* (2013.01)
USPC ........................ 705/26.5; 705/14.73; 705/26.7

(58) Field of Classification Search
USPC ........................................................... 705/26
See application file for complete search history.

(56) References Cited

To view the complete listing of prior art documents cited during the proceeding for Reexamination Control Number 95/000,533, please refer to the USPTO's public Patent Application Information Retrieval (PAIR) system under the Display References tab.

*Primary Examiner* — Dennis Bonshock

(57) ABSTRACT

The invention relates to a system and method for the automated selection of formulations and/or formulation components by specifying product characteristics. In particular, the system and method serve customers within market segments that use selected components as raw materials for manufacture of specialty products and that require an understanding of how the selected components effect performance. For example, such products as electronic circuits, coatings, adhesives, sealants, inks, polishes, cleaners, and detergents fall within the profile of such products.

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-4, 6-13, 15-23, 25-35, 37-44, 46-55, 57-61, 68-70, 74-81, 88-90 and 94-100 is confirmed.

Claims 5, 14, 24, 36, 45, 56, 62-67, 71-73, 82-87 and 91-93 were not reexamined.

* * * * *